(12) United States Patent
Khojastepour

(10) Patent No.: US 9,444,536 B2
(45) Date of Patent: *Sep. 13, 2016

(54) PRECODING WITH A CODEBOOK FOR A WIRELESS SYSTEM

(71) Applicant: NEC Corporation, Tokyo (JP)

(72) Inventor: Mohammad Khojastepour, Princeton, NJ (US)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,734

(22) Filed: Aug. 6, 2015

(65) Prior Publication Data

US 2015/0341094 A1    Nov. 26, 2015

Related U.S. Application Data

(60) Continuation of application No. 14/037,601, filed on Sep. 26, 2013, now Pat. No. 9,136,928, which is a division of application No. 13/952,160, filed on Jul. 26, 2013, now Pat. No. 9,071,301, which is a division (Continued)

(51) Int. Cl.
| | | |
|---|---|---|
| H04B 7/04 | (2006.01) |
| H04B 7/06 | (2006.01) |
| H04W 52/42 | (2009.01) |

(52) U.S. Cl.
CPC ............ *H04B 7/0486* (2013.01); *H04B 7/046* (2013.01); *H04B 7/0408* (2013.01); *H04B 7/0456* (2013.01); *H04B 7/0617* (2013.01); *H04W 52/42* (2013.01)

(58) Field of Classification Search
CPC .... H04B 7/46; H04B 7/0408; H04B 7/0456; H04W 52/42
USPC ...... 455/562.1, 425; 370/342, 436; 375/260, 375/267, 299, 347, 355
See application file for complete search history.

(56) References Cited

U.S. PATENT DOCUMENTS

| | | | |
|---|---|---|---|
| 5,396,625 | A | 3/1995 | Parkes |
| 5,506,801 | A | 4/1996 | Tawel |
| 6,369,756 | B1 | 4/2002 | Wang et al. |
| 6,487,554 | B2 | 11/2002 | Ganapathy et al. |
| 6,580,394 | B2 | 6/2003 | Wang et al. |
| 7,013,378 | B2 | 3/2006 | Motta et al. |

(Continued)

OTHER PUBLICATIONS

E. Telatar, "Capacity of multi-antenna Gaussian channels," AT & T Bell Labs Internal Tech. Memo, Jun. 1995.

(Continued)

*Primary Examiner* — Hai V Nguyen
(74) *Attorney, Agent, or Firm* — Finnegan, Henderson, Farabow, Garrett & Dunner LLP

(57) ABSTRACT

A base station used in a wireless communications system with multiple transmission ranks is disclosed. The base station comprises a memory to store a codebook for a transmission rank, a beamforming controller to precode data with a precoding matrix selected from the codebook, and a transmitter to transmit the precoded data to a user equipment, wherein the precoding matrix is selected according to a first description and a second description, which are unique to the precoding matrix, and wherein the second description provides a finer description of the codebook than the first description. Other methods, systems, and apparatuses also are disclosed.

9 Claims, 17 Drawing Sheets

Related U.S. Application Data of application No. 13/547,544, filed on Jul. 12, 2012, now Pat. No. 8,504,098, which is a division of application No. 13/029,561, filed on Feb. 17, 2011, now Pat. No. 8,391,925, which is a division of application No. 11/674,330, filed on Feb. 13, 2007, now Pat. No. 7,917,176.

(60) Provisional application No. 60/743,290, filed on Feb. 14, 2006.

(56) References Cited

U.S. PATENT DOCUMENTS

| | | | | |
|---|---|---|---|---|
| 7,120,199 | B2 | 10/2006 | Thielecke et al. | |
| 7,248,638 | B1 | 7/2007 | Banister | |
| 7,330,701 | B2 | 2/2008 | Mukkavilli et al. | |
| 7,336,727 | B2 | 2/2008 | Mukkavilli et al. | |
| 7,409,001 | B2* | 8/2008 | Ionescu | H04B 7/0417 375/267 |
| 7,492,752 | B2* | 2/2009 | Harris | H04W 52/267 370/318 |
| 7,548,752 | B2 | 6/2009 | Sampath et al. | |
| 7,573,806 | B2 | 8/2009 | Ihm et al. | |
| 7,620,067 | B2 | 11/2009 | Niu et al. | |
| 7,630,391 | B2* | 12/2009 | Jin | H04W 72/0413 370/328 |
| 7,633,906 | B2* | 12/2009 | Jin | H04B 7/0639 370/328 |
| 7,649,831 | B2* | 1/2010 | Van Rensburg | H04B 7/0639 370/203 |
| 7,676,007 | B1* | 3/2010 | Choi | H04B 7/0617 375/267 |
| 7,689,177 | B2* | 3/2010 | Kim | H04B 7/0417 455/101 |
| 7,697,621 | B2 | 4/2010 | Horng et al. | |
| 7,702,029 | B2* | 4/2010 | Kotecha | H04B 7/0417 375/267 |
| 7,715,803 | B2 | 5/2010 | Niu et al. | |
| 7,746,952 | B2* | 6/2010 | Suh | H04B 7/0408 375/267 |
| 7,751,510 | B2 | 7/2010 | Budianu et al. | |
| 7,764,746 | B2* | 7/2010 | Clerckx | H04B 7/0434 341/106 |
| 7,768,903 | B2 | 8/2010 | Ihm et al. | |
| 7,769,365 | B2 | 8/2010 | Richardson et al. | |
| 7,773,685 | B2 | 8/2010 | Tirkkonen et al. | |
| 7,778,826 | B2 | 8/2010 | Lin et al. | |
| 7,782,573 | B2 | 8/2010 | Zhou et al. | |
| 7,817,739 | B2* | 10/2010 | Wennstrom | H04B 7/0634 375/260 |
| 7,839,835 | B2 | 11/2010 | Khojastepour et al. | |
| 7,881,247 | B2* | 2/2011 | Pan | H04B 7/0634 370/319 |
| 7,881,395 | B2* | 2/2011 | Lee | H04B 7/0671 375/267 |
| 7,885,349 | B2* | 2/2011 | Lee | H04B 7/0417 370/210 |
| 7,895,044 | B2 | 2/2011 | Lin et al. | |
| 7,899,132 | B2 | 3/2011 | Lee et al. | |
| 7,917,176 | B2* | 3/2011 | Khojastepour | H04B 7/0408 370/203 |
| 7,929,636 | B2* | 4/2011 | Kotecha | H04B 7/0417 375/285 |
| 7,948,959 | B2* | 5/2011 | Wang | H04B 7/0417 370/342 |
| 7,949,318 | B2 | 5/2011 | Prasad et al. | |
| 7,961,640 | B2 | 6/2011 | Prakash et al. | |
| 7,961,802 | B2* | 6/2011 | Li | H04B 7/0417 370/328 |
| 7,961,807 | B2* | 6/2011 | Kotecha | H04B 7/0417 375/267 |
| 8,000,258 | B2* | 8/2011 | Ko | H04B 7/0413 370/230 |
| 8,000,401 | B2* | 8/2011 | Lee | H04B 7/0671 370/203 |
| 8,023,457 | B2* | 9/2011 | Kotecha | H04B 7/0417 370/269 |
| 8,023,466 | B2 | 9/2011 | Ma et al. | |
| 8,031,793 | B2* | 10/2011 | Ionescu | H04L 1/0041 375/267 |
| 8,050,357 | B2* | 11/2011 | Clerckx | H04B 7/0413 375/299 |
| 8,068,554 | B2 | 11/2011 | Lin et al. | |
| 8,103,312 | B2 | 1/2012 | Khojastepour | |
| 8,111,679 | B2 | 2/2012 | Tsutsui | |
| 8,111,780 | B2 | 2/2012 | Clerckx et al. | |
| 8,121,212 | B2* | 2/2012 | Kwon | H04B 7/0639 370/310 |
| 8,130,666 | B2* | 3/2012 | Zhou | H04B 7/0452 370/252 |
| 8,140,098 | B2* | 3/2012 | Gorokhov | H04B 7/0617 455/452.2 |
| 8,144,808 | B2 | 3/2012 | Clerckx et al. | |
| 8,184,544 | B2* | 5/2012 | Ko | H04B 7/0417 370/249 |
| 8,194,602 | B2 | 6/2012 | van Rensburg et al. | |
| 8,194,762 | B2* | 6/2012 | Mondal | H04L 5/0023 375/260 |
| 8,194,773 | B2* | 6/2012 | Jung | H04L 25/03343 375/262 |
| 8,199,836 | B2* | 6/2012 | Khojastepour | H04B 7/0639 375/219 |
| 8,204,142 | B2* | 6/2012 | Hwang | H04B 7/0452 375/267 |
| 8,223,740 | B2* | 7/2012 | Jin | H04B 7/0639 370/328 |
| 8,229,019 | B2 | 7/2012 | Kotecha et al. | |
| 8,233,560 | B2 | 7/2012 | Khojastepour | |
| 8,234,546 | B2* | 7/2012 | Mielczarek | H04B 7/0619 370/252 |
| 8,238,461 | B2* | 8/2012 | Zhou | H04B 7/0413 375/260 |
| 8,238,854 | B2 | 8/2012 | Khojastepour et al. | |
| 8,249,658 | B2 | 8/2012 | Khojastepour | |
| 8,249,659 | B2 | 8/2012 | Khojastepour | |
| 8,254,998 | B2 | 8/2012 | Khojastepour | |
| 8,254,999 | B2 | 8/2012 | Khojastepour | |
| 8,259,599 | B2* | 9/2012 | Ghady | H04L 7/0639 342/373 |
| 8,259,835 | B2* | 9/2012 | Kim | H04B 7/0417 375/267 |
| 8,259,842 | B2 | 9/2012 | Khojastepour | |
| 8,260,208 | B2* | 9/2012 | Auer | H04B 5/0023 370/329 |
| 8,265,697 | B2 | 9/2012 | Khojastepour | |
| 8,265,698 | B2 | 9/2012 | Khojastepour | |
| 8,265,699 | B2 | 9/2012 | Khojastepour | |
| 8,270,515 | B2* | 9/2012 | Ashikhmin | H04B 7/0417 375/260 |
| 8,270,918 | B2 | 9/2012 | Khojastepour et al. | |
| 8,271,023 | B2 | 9/2012 | Khojastepour | |
| 8,284,849 | B2* | 10/2012 | Lee | H04B 7/0671 375/260 |
| 8,284,861 | B2 | 10/2012 | Khojastepour | |
| 8,285,232 | B2 | 10/2012 | Khojastepour et al. | |
| 8,290,079 | B2* | 10/2012 | Li | H04B 7/0634 375/260 |
| 8,300,616 | B2* | 10/2012 | Tang | H04L 25/03343 370/204 |
| 8,300,727 | B2* | 10/2012 | Huang | H04B 7/0417 370/203 |
| 8,315,329 | B2 | 11/2012 | Khojastepour | |
| 8,315,346 | B2* | 11/2012 | Kim | H04B 7/0417 375/354 |
| 8,340,961 | B2 | 12/2012 | Lin et al. | |
| 8,346,193 | B2 | 1/2013 | Khojastepour et al. | |
| 8,351,535 | B2* | 1/2013 | Kim | H04B 7/0639 370/330 |
| 8,351,544 | B2* | 1/2013 | Mondal | H04B 7/0417 375/267 |
| 8,351,986 | B2 | 1/2013 | Khojastepour | |
| 8,369,788 | B2* | 2/2013 | Kim | H04B 7/024 370/328 |
| 8,374,562 | B2 | 2/2013 | Khojastepour et al. | |

(56) References Cited

U.S. PATENT DOCUMENTS

| | | | |
|---|---|---|---|
| 8,379,618 B2 | 2/2013 | Khojastepour | |
| 8,379,749 B2* | 2/2013 | Taoka | H04B 7/0617 375/267 |
| 8,379,753 B2 | 2/2013 | Khojastepour | |
| 8,385,433 B2* | 2/2013 | Wang | H04B 7/0417 375/259 |
| 8,391,925 B2 | 3/2013 | Khojastepour | |
| 8,417,517 B2 | 4/2013 | Lin et al. | |
| 8,428,937 B2 | 4/2013 | Lin et al. | |
| 8,452,334 B2 | 5/2013 | Khojastepour | |
| 8,547,901 B2* | 10/2013 | Amiri | H04W 40/00 370/203 |
| 8,682,656 B2 | 3/2014 | Lin et al. | |
| 8,705,404 B2* | 4/2014 | Kim | H04W 72/02 370/254 |
| 8,976,759 B2* | 3/2015 | Khojastepour | H04B 7/0417 370/331 |
| 2005/0094598 A1 | 5/2005 | Medvedev et al. | |
| 2005/0286663 A1* | 12/2005 | Poon | H04B 7/0417 375/347 |
| 2006/0039493 A1 | 2/2006 | Mukkavilli et al. | |
| 2006/0111148 A1 | 5/2006 | Mukkavilli et al. | |
| 2006/0135169 A1 | 6/2006 | Sampath et al. | |
| 2006/0153112 A1* | 7/2006 | Lim | H04L 5/0007 370/310 |
| 2006/0159195 A1* | 7/2006 | Ionescu | H04L 1/0041 375/267 |
| 2006/0171295 A1* | 8/2006 | Ihm | H04L 5/0046 370/208 |
| 2006/0203794 A1 | 9/2006 | Sampath et al. | |
| 2006/0203891 A1 | 9/2006 | Sampath et al. | |
| 2006/0268788 A1 | 11/2006 | Harris et al. | |
| 2007/0025460 A1* | 2/2007 | Budianu | H04L 25/0204 375/260 |
| 2007/0026810 A1 | 2/2007 | Love et al. | |
| 2007/0071147 A1 | 3/2007 | Sampath et al. | |
| 2007/0097856 A1* | 5/2007 | Wang | H04B 7/0417 370/210 |
| 2007/0097889 A1 | 5/2007 | Wang et al. | |
| 2007/0098099 A1* | 5/2007 | Gore | H04L 1/0016 375/260 |
| 2007/0098106 A1 | 5/2007 | Khojastepour et al. | |
| 2007/0115909 A1 | 5/2007 | Wang et al. | |
| 2007/0133707 A1* | 6/2007 | Hwang | H04B 7/0417 375/267 |
| 2007/0165738 A1* | 7/2007 | Barriac | H04L 1/0687 375/267 |
| 2007/0174038 A1 | 7/2007 | Wang et al. | |
| 2007/0177688 A1* | 8/2007 | Wu | H04B 7/0417 375/267 |
| 2007/0189151 A1* | 8/2007 | Pan | H04L 1/0009 370/210 |
| 2007/0191066 A1 | 8/2007 | Khojastepour et al. | |
| 2007/0280386 A1 | 12/2007 | Waes et al. | |
| 2007/0297529 A1* | 12/2007 | Zhou | H04B 7/0417 375/267 |
| 2008/0049596 A1* | 2/2008 | Khojastepour | H04B 7/043 370/203 |
| 2008/0069031 A1* | 3/2008 | Zhang | H04B 7/0617 370/328 |
| 2008/0159425 A1 | 7/2008 | Khojastepour et al. | |
| 2008/0188190 A1* | 8/2008 | Prasad | H04B 7/0617 455/114.3 |
| 2008/0212461 A1 | 9/2008 | Pande et al. | |
| 2008/0225960 A1 | 9/2008 | Kotecha et al. | |
| 2008/0232501 A1* | 9/2008 | Khojastepour | H04B 7/0417 375/267 |
| 2008/0273612 A1* | 11/2008 | Khojastepour | H04L 25/03006 375/260 |
| 2009/0046800 A1 | 2/2009 | Xu et al. | |
| 2009/0097395 A1 | 4/2009 | Zhang et al. | |
| 2009/0274225 A1 | 11/2009 | Khojastepour et al. | |
| 2009/0296844 A1* | 12/2009 | Ihm | H04B 7/0478 375/267 |
| 2009/0298424 A1 | 12/2009 | Liu et al. | |
| 2009/0323615 A1 | 12/2009 | Ihm et al. | |
| 2009/0323844 A1* | 12/2009 | Lin | H04B 7/0617 375/260 |
| 2009/0326933 A1 | 12/2009 | Lin et al. | |
| 2010/0039928 A1 | 2/2010 | Noh et al. | |
| 2010/0067594 A1 | 3/2010 | Lin et al. | |
| 2010/0157921 A1 | 6/2010 | Lin et al. | |
| 2010/0254339 A1 | 10/2010 | Ihm et al. | |
| 2011/0134775 A1 | 6/2011 | Khojastepour | |
| 2011/0194400 A1 | 8/2011 | Khojastepour | |
| 2011/0194646 A1 | 8/2011 | Khojastepour | |
| 2011/0194647 A1 | 8/2011 | Khojastepour | |
| 2011/0194649 A1 | 8/2011 | Khojastepour | |
| 2011/0243017 A1* | 10/2011 | Prasad | H04W 72/085 370/252 |
| 2011/0243018 A1 | 10/2011 | Prasad et al. | |
| 2011/0243019 A1 | 10/2011 | Prasad et al. | |
| 2011/0268209 A1 | 11/2011 | Khojastepour | |
| 2011/0268210 A1 | 11/2011 | Khojastepour | |
| 2011/0268211 A1 | 11/2011 | Khojastepour | |
| 2011/0268212 A1 | 11/2011 | Khojastepour | |
| 2011/0268213 A1 | 11/2011 | Khojastepour | |
| 2011/0268214 A1 | 11/2011 | Khojastepour | |
| 2011/0268215 A1 | 11/2011 | Khojastepour | |
| 2011/0268224 A1 | 11/2011 | Khojastepour | |
| 2012/0057657 A1 | 3/2012 | Khojastepour et al. | |
| 2012/0188883 A1* | 7/2012 | Sampath | H04L 1/0026 370/252 |
| 2012/0269279 A1 | 10/2012 | Khojastepour | |
| 2012/0275313 A1* | 11/2012 | Prasad | H04B 7/0417 370/241 |
| 2013/0040705 A1 | 2/2013 | Khojastepour | |
| 2013/0329823 A1 | 12/2013 | Khojastepour | |
| 2014/0023160 A1 | 1/2014 | Khojastepour | |

OTHER PUBLICATIONS

V. Tarokh et al., "Space-time codes for high data rate wireless communication," IEEE Trans. on Info. Theory, vol. 44, No. 2, pp. 744-765, Mar. 1998.

G. J. Foschini et al., "On limits of wireless communications in a fading environment when using multiple antennas," Wireless Personal Comm., vol. 6, p. 311, 1998.

G. J. Foschini et al., "Capacity when using multiple antennas at transmit and receive sites and rayleigh-faded matrix channel is unknown to the transmitter," 1998.

T. L. Marzetta et al., "Capacity of a mobile multiple-antenna communication link in Rayleigh flat fading," IEEE Trans.on Info. Theory, vol. 45, No. 1, pp. 139-157, Jan. 1999.

E. Biglieri et al., "Limiting performance of block-fading channels with multiple antennas," IEEE Trans.on Info. Theory, vol. 47, pp. 1273-1289, Sep. 2001.

G. Caire et al., "Optimum power control over fading channels," IEEE Trans.on Info. Theory, vol. 45, No. 5, pp. 1468-1489, Jul. 1999.

A.Narula et al., "Efficient use of side information in multiple-antenna data transmission over fading channels," IEEE Jrnl. on Sel. Areas of Comm., vol. 16, No. 8, pp. 1423-1436,1998.

E. Visotsky et al., "Space-time precoding with imperfect feedback," in Proceedings ISIT 2000, Sorrento, Italy, Jun. 2000.

Intel, "Codebook design for Precoded MIMO," 3GPP RAN1 LTE, R1-060672, Feb. 2006.

NEC Group, "MIMO techniques for Downlink E-UTRA: Detailed description and Simulation results," TSG-RAN WG1 Meeting #44, R1-060362, Denver, Colorado, Feb. 13-17, 2006.

NEC Group, "Mimo techniques for Downlink E-UTRA," TSG-RAN WG1 Meeting #43, R1-051455, Seoul, Republic of Korea, Nov. 7-11, 2005.

A. Abdel-Samad et al., "Robust transmit eigen-beamforming based on imperfect channel state information," ITG Workshop on Smart Antennas, 2004.

S. Bhashyam et al., "Feedback gain in multiple antenna systems," IEEE Transactions on Communications, vol. 50, No. 5, pp. 785-798, May 2002.

(56) References Cited

OTHER PUBLICATIONS

K. Mukkavilli et al., "On beamforming with finite rate feedback in multiple-antenna systems," IEEE Trans, on Info. Theory, pp. 2562-2579, 2003.

D. Love et al., "Grassmannian beamforming for multiple-input multiple-output wireless systems," IEEE Trans, on Info. Theory, vol. 49, pp. 2735-2747, 2003.

D. Love et al., "What is the value of limited feedback for mimo channels?" IEEE Communications Magazine, vol. 42, pp. 54-59, 2004.

D. Love et al., "Limited feedback unitary precoding for orthogonal space-time block codes," IEEE Trans, on Signal Proc., vol. 53, pp. 64-73, 2005.

J. Roh et al., "Multiple antenna channels with partial channel state information at the transmitter," IEEE Trans, on Wireless Comm., IEEE Trans., vol. 3, pp. 677-688, 2004.

S. A. Jafar et al., "Throughput maximization with multiple codes and partial outages," Proc. of Globecom Conf., San Antonio, Texas, 2001.

E. Visotsky et al., "Space-Time Transmit Precoding With Imperfect Feedback," IEEE Trans, on Info. Theory, vol. 47, No. 6, Sep. 2001.

L. Ozarow et al., "Information theoretic considerations for cellular mobile radio," IEEE Transactions on Vehicular Technology, vol. 43, pp. 359-378, May 1994.

\* cited by examiner

| PARAMETER | ASSUMPTION |
|---|---|
| Access | OFDM |
| RF carrier frequency | 2.0 GHz |
| Bandwidth | 5.0 MHz |
| Number of paths (Multi-path model) | 6 |
| Sub-carrier spacing | 15.0 kHz |
| Sampling frequency | 7.68 MHz |
| Number of occupied sub-carriers | 301 |
| Number of OFDM symbols per TTI | 12 (6 x 2) |
| Number of data symbols per TTI | 3600 (1800 x 2) |
| Symbol rate | 7.2 M/s |
| CP length | 4.82 micro second |
| FFT point | 512 |
| Number of antennas at BS | 4 |
| Number of antennas at UE | 2 |
| Number of feedback bits | 8 bits/(OFDM tone chunk) |
| CQI description | 5 bits |
| Channel model | GSM Typical Urban: 3kmph |
| Channel estimation | Ideal channel estimation |
| Tx and Rx antenna correlation | Without spatial correlation |
| Feedback frequency | every TTI for each OFDM tone chunk |

*FIG. 8A*

Rank-1

| 0 | x | x | x | x | y | y | y |
|---|---|---|---|---|---|---|---|

Rank-2

| 1 | x | x | x | x | y | y | y |
|---|---|---|---|---|---|---|---|

*FIG. 8B*

PRECODING WITH A CODEBOOK FOR A WIRELESS SYSTEM

CROSS REFERENCE TO RELATED APPLICATIONS

This application is a continuation of co-pending patent application Ser. No. 14/037,601, entitled "PRECODING WITH A CODEBOOK FOR A WIRELESS SYSTEM," filed 26 Sep. 2013, which in turn is a division of patent application Ser. No. 13/952,160, entitled "PRECODING WITH A CODEBOOK FOR A WIRELESS SYSTEM," filed 26 Jul. 2013, which in turn is a division of patent application Ser. No. 13/547,544, entitled "METHOD OF PRECODING WITH A CODEBOOK FOR A WIRELESS SYSTEM," filed 12 Jul. 2012, which in turn is a division of patent application Ser. No. 13/029,561, entitled "Method of Precoding with a Codebook for a Wireless System With Multiple Transmission Ranks and a Quantized Beamforming Matrix," filed 17 Feb. 2011, which in turn is a division of patent application Ser. No. 11/674,330, entitled "Structured Codebook and Successive Beamforming for Multiple Antenna Systems", filed 13 Feb. 2007, which in turn claimed priority to Provisional Application No. 60/743,290, filed 14 Feb. 2006 and claimed the benefit of patent application Ser. No. 11/554,278, filed 30 Oct. 2006, the entire contents and file wrappers of which are hereby incorporated by reference for all purposes into this application.

FIELD OF THE INVENTION

The present invention relates to the field of wireless communications, particularly wireless, high-rate communications using multiple-antenna systems.

BACKGROUND INFORMATION

The hostility of the wireless fading environment and channel variation makes the design of high rate communication systems very challenging. To this end, multiple-antenna systems have shown to be effective in fading environments by providing significant performance improvements and achievable data rates in comparison to single antenna systems. Wireless communication systems employing multiple antennas both at the transmitter and the receiver demonstrate tremendous potential to meet the spectral efficiency requirements for next generation wireless applications. This has spurred research in the efficient design and deployment of various multiple-input-multiple-output (MIMO) configurations for practical systems. The collection of papers in IEEE *Transactions on Information Theory*, vol. 49, Issue 10, October 2003, represents a sample of the wide array of research in MIMO systems.

Moreover, multiple transmit and receive antennas have become an integral part of the standards of many wireless systems such as cellular systems and wireless LANs. In particular, the recent development of UMTS Terrestrial Radio Access Network (UTRAN) and Evolved-UTRA has raised the need for multiple antenna systems to reach higher user data rates and better quality of service, thereby resulting in an improved overall throughput and better coverage. A number of proposals have discussed and concluded the need for multiple antenna systems to achieve the target spectral efficiency, throughput, and reliability of EUTRA. These proposals have considered different modes of operation applicable to different scenarios. The basic assumptions that vary among such proposals include: (i) using a single stream versus multiple streams; (ii) scheduling one user at a time versus multiple users; (iii) having multiple streams per user versus a single stream per user; and (iv) coding across multiple streams versus using independent streams. A basic common factor, however, among the various downlink physical layer MIMO proposals is a feedback strategy to control the transmission rate and possibly a variation in transmission strategy.

While the proposals for the use of multiple antenna systems in downlink EUTRA such as per antenna rate control (PARC), per stream rate control (PSRC), per group rate control (PGRC), per user and stream rate control (PUSRC), per user unitary rate control (PU2RC), single codeword/multiple codeword transmission (SCW/MCW), spatial domain multiplex/spatial domain multiple access (SDM/SDMA), and current transmit diversity scheme in release 6 such as selection transmit diversity (STD), space-time transmit diversity (STTD), and transmit adaptive antennas (TxAA) differ in terms of the system description, they all share the following features: (i) possible multiplexing of streams to multiple streams; (ii) possible use of linear precoding of streams before sending to antennas; (iii) possible layering of the streams between the antennas; and (iv) rate control per stream or multiple jointly coded streams.

The performance gain achieved by multiple antenna system increases when the knowledge of the channel state information (CSI) at each end, either the receiver or transmitter, is increased. Although perfect CSI is desirable, practical systems are usually built only on estimating the CSI at the receiver, and possibly feeding back the CSI to the transmitter through a feedback link with a very limited capacity. Using CSI at the transmitter, the transmission strategy is adapted over space (multiple antennas) and over time (over multiple blocks).

The performance of multiple antenna systems with or without knowledge of the channel state information has been extensively analyzed over the last decade. Partial feedback models have been considered due to the limitations of the feedback channel from the receiver to the transmitter. Different partial feedback models include: channel mean feedback (see, e.g., A. Narula et al., "Efficient use of side information in multiple-antenna data transmission over fading channels," *IEEE Journal on Selected Areas of Communications*, vol. 16, no. 8, pp. 1423-1436, October 1998); channel covariance feedback (E. Visotsky et al., "Space-time precoding with imperfect feedback," in *Proceedings ISIT 2000*, Sorrento, Italy, June 2000); feedback of k-out-of-min (M,N) eigenvectors and eigenvalues of an M×N multiple antenna channel (J. Roh et al., "Multiple antenna channels with partial channel state information at the transmitter," *Wireless Communications, IEEE Transactions on*, vol. 3, pp. 677-688, 2004); partial feedback based on statistical model and robust design (A. Abdel-Samad et al., "Robust transmit eigen-beamforming based on imperfect channel state information," in *Smart Antennas*, 2004. *ITG Workshop on*, 2004); and quantized feedback.

Beamforming introduces an alternative use of quantized feedback bits in which the design is almost independent of the average received SNR and constant average transmit power is assumed at the transmitter. In beamforming, independent streams are transmitted along different eigenmodes of the channel resulting in high transmission rates without the need to perform space-time coding.

Beamforming has received considerable attention for the case of multiple transmit antennas and a single receive antenna. (See, e.g., Narula et al. cited above.) Rate regions for the optimality of dominant eigen-beamformers (rank-one beamformers) in the sense of maximizing mutual information has also been studied (see, e.g., S. A. Jafar, et al., "Throughput maximization with multiple codes and partial outages," in *Proceedings of Globecom Conference*, San Antonio, Tex., USA, 2001), as have systematic constructions for finite-size beamformer codebooks for multiple transmit single receive antenna systems resulting in near optimal performance. Similarly, a design criterion for a dominant eigen-beamformer, for use with both single and multiple receive antenna systems, has been proposed. (See D. Love et al., "Grassmannian beamforming for multiple-input multiple-output wireless systems," *IEEE Transactions on Information Theory*, vol. 49, pp. 2735-2747, 2003.) As discovered by the inventors of the present invention, however, such unit rank beamformers can result in significant performance degradation with MIMO systems for certain transmission rates, thus requiring higher rank transmission schemes.

The design of higher rank beamformers for MIMO systems has also been studied in the past. Roh et al. addressed the problem of MIMO beamforming in the presence of perfect knowledge about a subset of the channel eigenvectors. Knopp et al. explored the design of joint power control and beamforming when the eigenvectors and the eigenvalues are completely known at the transmitter. (See R. Knopp et al., "Power control and beamforming for systems with multiple transmit and receive antennas," *IEEE Transactions on Wireless Communications*, vol. 1, pp. 638-648, October 2002.) Jafar et al. derived the conditions for the optimality of MIMO beamforming (in the sense of achieving capacity) when the channel covariance is fed back to the transmitter. (See, S. A. Jafar et al. "Throughput maximization with multiple codes and partial outages," in *Proceedings of Globecom Conference*, San Antonio, Tex., USA, 2001.) The design of MIMO systems using multiple simultaneous streams for transmission when finite rate feedback is available in the system has also been studied (see Love et al., cited above.) The design criterion therein sought to quantize the set of active eigenvectors such that the loss in SNR compared to perfect channel feedback is minimized.

In addition to the aforementioned considerations, it is desirable to achieve the highest possible spectral efficiencies in MIMO systems with reasonable receiver and transmitter complexity. Though theoretically space-time codes are capable of delivering very high spectral efficiencies, e.g. 100s of megabits per second, their implementation becomes increasingly prohibitive as the bandwidth of the system increases.

SUMMARY OF THE INVENTION

The present invention is directed to quantized, multi-rank beamforming methods and apparatus. Embodiments of the present invention can considerably outperform known beamforming and precoding techniques for different transmission rates. Advantageously, the present invention can be implemented with low complexity at the transmitter, and can operate with a low feedback rate, common in most practical systems.

In an exemplary embodiment, a multi-rank beamforming strategy is presented in order to efficiently use the available spatial diversity in the MIMO downlink of Evolved-UTRA and UTRAN with the goal of achieving higher user data rates, and better quality of service with improved overall throughput and better coverage. The exemplary embodiment combines transmission rank control, rank-specific and structured quantized precoding codebook design, and successive beamforming.

A structured codebook in accordance with the present invention allows for successive beamforming and considerably reduces the memory requirement and computational complexity of the algorithm in comparison to the optimal codebook, while providing near-optimal performance. Successive beamforming in accordance with the present invention can be used to perform a finer quantization of a single vector in rank-1 transmission. Furthermore, re-use of the same quantization codebook for all ranks leads to a significant reduction in the memory required to store quantization vectors.

The aforementioned and other features and aspects of the present invention are described in greater detail below.

BRIEF DESCRIPTION OF THE DRAWINGS

FIG. 8A is a table of exemplary parameters used in simulating an exemplary embodiment of the present invention and FIG. 8B shows an exemplary format used for feedback information in such an embodiment.

DETAILED DESCRIPTION

Figure 1:
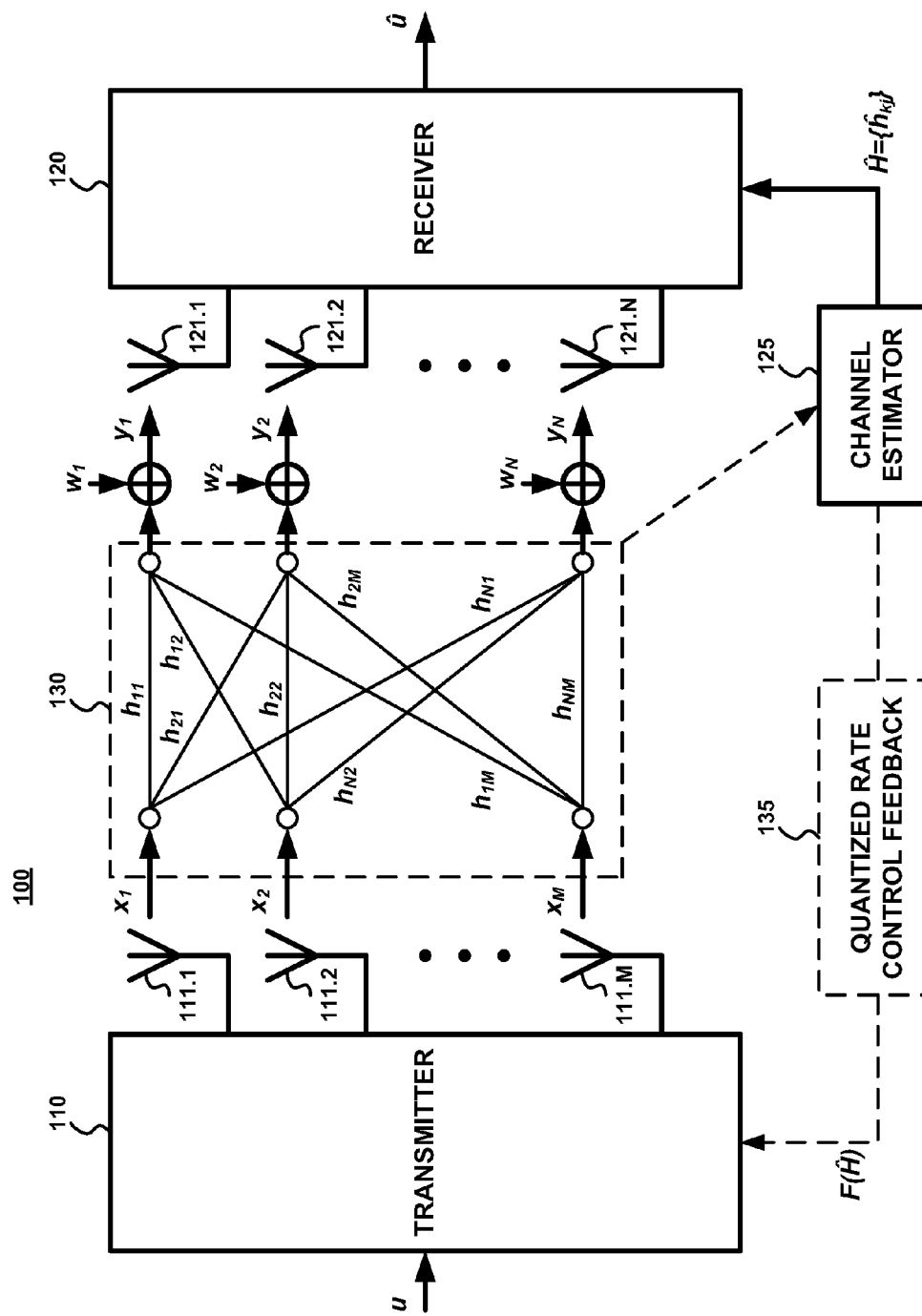
FIG. 1 is a schematic block diagram of a multiple-antenna communications system with quantized feedback of channel state information.

An exemplary multiple-antenna communication system 100 with quantized feedback is schematically shown in FIG. 1. A transmitter 110 transmits from t transmitting antennas 111.1-111.t over a fading channel 130 to r receiving antennas 121.1-121.r coupled to a receiver 120. A channel estimator 125 provides an estimate of the channel 130 to the receiver 120. The channel estimate is also quantized and provided to the transmitter 110 via a quantized rate control feedback channel 135.

For purposes of analysis, a flat fading channel model is assumed in which the channel remains constant for each block of transmission. Furthermore, the feedback channel 135 is assumed to be an error-free, zero-delay feedback channel from the receiver to the transmitter, carrying B bits of information about the channel realization every frame.

For a multiple-antenna system with r receive and t transmit antennas the baseband channel model can be expressed as follows:

$$Y = HX + W, \tag{1}$$

where Y is the r×1 received column vector, H is the r×t channel matrix, X is the t×1 transmit column vector, and W is the r×1 noise column vector. The input is subject to an average power constraint P, i.e.:

$$tr(Q) \leq P, \text{ where } Q = \mathbb{E}[XX^H], \tag{2}$$

$\mathbb{E}[.]$ denotes the expected value, and tr(.) represents the trace of a matrix. A goal of an exemplary space adaptation scheme is to minimize the frame error rate, which tightly follows the outage behavior of the transmission strategy, defined as:

$$P_{out} = \text{Prob}\{\log \det(I_n + HQH^H) < R\},$$

$$s.t. \ tr(Q) \leq P, \ Q \leq 0 \tag{3}$$

where $I_n$ is an identity matrix of size n and R is the attempted transmission rate.

In an exemplary multi-rank beamforming scheme in accordance with the present invention, channel state information (CSI) is available to the transmitter (CSIT) as well as the receiver (CSIR). Where perfect CSIT and CSIR are assumed, the capacity of the multiple-antenna fading channel 130 can be achieved through power adaptation over time (one average power for each channel state) and water-filling power control over multiple eigenvectors of the channel for each block of transmission. This translates into power control over multiple antennas in the spatial domain. The nature of the water-filling power control implies that transmission may occur only on a subset of eigenvectors of the channel depending on the channel condition. Therefore, to maximize the system throughput, the number of eigenvectors in which communication occurs, defined as the transmission rank, is controlled. For a given transmission rate, the transmission rank depends on the channel condition, where the transmission rank is at most equal to m=min(t, r). Thus, the set of all channel conditions is divided into m partitions, where the k-th partition represents the channel conditions for which the beamformer rank is equal to k, i.e., transmission occurs on the largest k eigenvectors out of a total of min(t, r) eigenvectors of the channel H.

Codebook Design

The codebook design for the beamforming or precoding in multiple antenna system entails finding the best packing in a Grassmanian manifold.

In general, each precoding matrix U of size t×n defines an n-dimensional subspace of a t-dimensional complex vector space $W = \mathbb{C}$, where $\mathbb{C}$ is the space of complex numbers. The matrix U may interchangeably be used to denote the space that is spanned by U. The set of all precoding matrices of size t×n constitutes a Grassmannian manifold denoted by G(t, n) or $G_n(W)$. The set of all beamforming vectors of size t×1 forms a Grassmanian manifold of G(t, 1), that is also known as the projective space P(W).

A packing in a Grassmannian manifold is then defined with respect to a metric in the corresponding space. Using the metric, the distance between two points on the manifold can be defined. Since each point in Grassmanian manifold G(t, n) is a n-dimensional space, the metric in fact measures the subspace distance between two t-dimensional subspaces.

Two metrics have been used for generating the precoding codebooks in multiple antenna communication systems: chordal distance and Fubini-Study distance. These metrics, however, are not the best metrics to be used for the design of precoders for multiple antenna systems. We can show that the packing with respect to the Fubini-Study metric gives the precoding codebook that is good only at very high SNRs and the packing with respect to Chordal distance gives the precoding codebook that is good only at very low SNRs.

In an exemplary embodiment, a new metric (called "p-metric") is used which is provably a valid metric for all the positive real values of a parameter $p \in \mathbb{R}$. The p-metric enables the design of a codebook that is good for a desired range of SNR. An interesting property of the p-metric is that as p goes to infinity, the p-metric becomes equivalent to the Fubini-Study metric and as p goes to zero, the p-metric becomes equivalent to chordal distance. In other words, "∞-metric" and "0-metric" are equivalent to Fubini-Study and chordal metric, respectively.

The chordal distance, Fubini-Study distance, and p-metric between two subspaces $V_{t \times n}$ and $U_{t \times n}$ are respectively defined as:

$$d_{chordal} = \frac{1}{\sqrt{2}} \|UU^* - VV^*\|_F, \tag{4}$$

$$d_{FS} = \text{Arccos}(|\det(U^*V)|), \tag{5}$$

$$d_P = \text{Arccos}\left(\left|\det\left(\frac{I + pU^*VV^*U}{(1+p)^n}\right)\right|^{\frac{1}{2}}\right). \tag{6}$$

For the purpose of successive beamforming, one set of quantized beamforming codebooks is generated consisting of k codebooks, one for each packing of lines in the Grassmannian manifold of G(t−i+1, 1), for i=1, 2, . . . , k. The optimal packing uses the p-metric as the measure of the distance between the subspaces where the parameter p is chosen some where in the desired range of SNR. The distribution of the vectors is not necessarily isotropic, however, therefore the codebook design depends on the channel statistics and is not necessarily the packing with respect to this metric. For an iid Rayleigh channel, the optimal codebook is generated by finding the optimal packing with respect to the p-metric. At high SNR, this packing becomes the packing with respect to the Fubini-Study metric and at low SNR becomes the packing with respect to chordal distance.

Successive Beamforming

The singular value decomposition of the channel estimate H can be expressed as follows:

$$H = UDV^*, \tag{7}$$

where U and V are unitary matrices representing the left and right eigenvectors of H and D is a diagonal matrix of eigenvalues in descending order (V* denotes the hermitian of matrix V). The column of the unitary matrix V represents different eigenmodes of the channel.

$$V=[v_1 v_2 \ldots v_n]. \qquad (8)$$

An exemplary multi-rank beamformer picks the first k columns of the matrix V that correspond to the first k dominant eigenmodes of the channel due to the properties of the singular value decomposition. Choosing the rank of the beamformer is based on a long term rank prediction policy by the transmitter, e.g. the base station (BS), or it can be performed at the receiver, e.g. the mobile user equipment (UE), by using a modified capacity calculation. Details of exemplary schemes of performing rank adaptation are described below with reference to flowcharts shown in FIGS. 3-7 and 13A-16.

For a given rank k, the aim of successive beamforming is to find the best quantization of the actual k dominant eigenmodes of the channel. The successive beamforming for $[v_1 v_2 \ldots v_k]$ is performed as follows.

First, $v_1$ is quantized using the codebook $C^{(t)}$ of the t-vectors in t-dimensional complex vector space $\mathbb{C}^t$. The quantized vector $u_1 \in C^{(t)}$ is chosen to maximize $\langle v_1, u_1 \rangle = |v_1^* u_1|$. The index of $u_1$ constitutes the quantized feedback information for the first vector.

Second, a rotation matrix $\phi(u_1)$ is found such that:

$$\phi(u_1) u_1 = e_1 = [1;0;0;\ldots;0] \qquad (9)$$

where $e_1$ denotes a unit norm vector in a principal direction $[1;0;0;\ldots;0]$.

Third, all of the vectors $v_1 v_2 \ldots v_n$ are rotated by the rotation matrix $\phi(u_1)$, whereby:

$$V'=[v_1' v_2' \ldots v_n']=\phi(u_1)V=[\phi(u_1)v_1 \phi(u_1)v_2 \ldots \phi(u_1)v_n], \qquad (10)$$

where all of the first elements of $v_2' v_3' \ldots v_n'$ are zero due to the fact that V is a unitary matrix and all of its columns are orthogonal. Moreover, if $u_1=v_1$, the first vector $v_1'$ becomes $e_1$.

Fourth, the same beamforming procedure described in the first three steps are applied to a new matrix:

$$\tilde{V}=V'(2:end,2:end). \qquad (11)$$

This step is successively performed until all the vectors are quantized.

The above successive beamforming technique generates different amounts of feedback for different ranks. Therefore, if the number of feedback bits is given, different size codebooks can be generated to be used for different rank beamforming. For example, where the possible rank of the channel is 1 or 2, and 8 bits of feedback are available, 1 bit can be dedicated for rank selection, and the other 7 bits for description of the eigenmodes. For rank 1, the 7 bits would provide for $2^7=128$ t-vectors to be used for the quantization of the dominant eigenmode of the channel. For rank 2, 4 bits can be used for the first eigenmode and 3 bits for the second eigenmode. As such, there would be $2^4=16$ t-vectors to quantize the first eigenmode, and $2^3=8$ (t-1)-vectors to quantize the second eigenmode.

Due to the computational complexity and memory requirement of such a beamforming strategy, an alternative exemplary beamforming strategy which uses the same idea of successive beamforming described above to quantize the vectors for the rank-1 case, will now be described. In this exemplary embodiment, the same codebook of 16 t-vectors and 8 (t-1)-vectors that is used for rank-2 beamforming is also used for rank-1 beamforming. Assume that only one vector $v_1$ is to be quantized using k codebooks comprised of t-vectors, (t-1)-vectors, etc., up to and including (t-k+1)-vectors, respectively.

First, $v_1$ is quantized using the codebook $C^{(t)}$ of the t-vectors in $\mathbb{C}^t$. The quantized vector $u_1 \in C^{(t)}$ is chosen to maximize $\langle v_1, u_1 \rangle = |v_1^* u_1|$.

Second, to find a finer description of $v_1$, the residual part of $v_1$ that lies in the orthogonal space defined by $\text{span}\{u_1^\perp\}$ is determined. Let:

$$v_2 = v_1 - (v_1^* u_1) u_1, \qquad (12)$$

which is then normalized:

$$v_2' = v_2/|v_2|. \qquad (13)$$

A rotation matrix $\phi(u_1)$ is then determined such that:

$$\phi(u_1) u_1 = e_1 = [1;0;0;\ldots;0]. \qquad (14)$$

Third, the vector $v_2'$ is rotated by the rotation matrix $\phi(u_1)$:

$$v_2'' = \phi(u_1) v_2' \qquad (15)$$

where the first element of $v_2''$ is zero due to the fact that V is a unitary matrix and all of its columns are orthogonal.

In a fourth step, the above three steps are then performed on a new vector, $\tilde{v}_2 = v_2''(2:end)$. This step will be performed successively until all k codebooks of t-vectors, (t-1)-vectors, up to (t-k+1)-vectors are used.

Therefore the exemplary successive beamforming method is performed on $v_1$, its residual on the orthogonal space span $\{u_1^\perp\}$ defined by $v_2''$, and so on, instead of the orthogonal modes $v_1, v_2, \ldots$. By thus applying successive beamforming to the residual vectors, the ratio of the projection of $v_1$ in each successive space needs to be quantized for the reconstruction. For example, for k=2, this entails quantizing the value $|v_1^* u_1|/|v_2|$. In some communication systems, feedback bits that are reserved for the feedback of the rate information for the rank-2 transmission strategy may be used to convey the quantization of this value.

Exemplary Codebook Representation

The exemplary precoder selection process described above relies on a set of vectors $V^1 = \{v_i^1 \in C^M\}_{i=1}^{N_1}$, $V^2 = \{v_i^2 \in C^{M-1}\}_{i=1}^{N_2}, \ldots, V^{M-1} = \{v_i^{M-1} \in C^2\}_{i=1}^{N_{M-1}}$, where $C^N$ denotes the N-dimensional complex space and a set of rotations defined by $\phi(v)$ for all vectors v in the codebook.

An exemplary representation of the codebook based on extending a result from the real vector space to the complex vector space will now be described. It is known that any M×M unitary matrix $V \in R^M \times R^M$ (where R denotes the set of real numbers) can be written as:

$$V = \left[ v^1, HH(v^1 - e_1^M) \begin{bmatrix} 0 \\ v^2 \end{bmatrix}, HH(v^1 - e_1^M) \begin{bmatrix} 0 \\ HH(v^2 - e_1^{M-1}) \begin{bmatrix} 0 \\ v^3 \end{bmatrix} \end{bmatrix} \right], \qquad (16)$$

where $v^a$ denotes the $a^{th}$ column of matrix V and $v_b^a$ denotes the $b^{th}$ element of the vector $v^a$ and $$H(w) = I - 2 \frac{w w^T}{\|w\|^2}$$

is the Householder transformation. This expansion, however, cannot be generally done for a matrix $V \in C^M \times C^M$, where C is the set of complex numbers.

Any Unitary matrix V can be written in the form of:

$$V = \left[ v^1, \Phi(v_1^1)HH\left(\frac{v^1}{\Phi(v_1^1)} - e_1^M\right)\begin{bmatrix} 0 \\ v^2 \end{bmatrix} \right], \quad (17)$$

$$\Phi(v_1^1)HH(v^1 - e_1^M)\begin{bmatrix} 0 \\ \Phi(v_2^2)HH(v^2 - e_1^{M-1})\begin{bmatrix} 0 \\ v^3 \end{bmatrix} \end{bmatrix}, \ldots,$$

where $e_1^N = [1,0, \ldots, 0]^T \in C^N$, $V^a$ denotes the $a^{th}$ column of matrix V, $v_b^a$ denotes the $b^{th}$ element of the vector $v^a$, and the function $\Phi(v_b^a)$, called the phase function, is defined as $$\Phi(v_b^a) = \frac{v_b^a}{\|v_b^a\|}.$$

Based on the above expansion, the codebook for a MIMO system with M antennas is defined by sets of:

$$V^1 = \{v_i^1 \in C^M\}_{i=1}^{N_1}, V^2 = \{v_i^2 \in C^{M-1}\}_{i=1}^{N_2}, \ldots, V^{M-1} = \{v_i^{M-1} \in C^2\}_{i=1}^{N_{M-1}}, \quad (18)$$

where the first elements of all the vectors are real-valued. The set of phases $\Phi(v_b^a)$ can be used in the design of the codebook based on the channel characteristics. The values of $\Phi(v_b^a)$, however, do not directly affect the computation of the inner product in finding the precoding matrix index.

In an exemplary case, all phase functions are equal to one. In this case, the set of precoding matrices are formed using these vectors along with the unitary Householder matrices of the form, $$H(w) = I - 2\frac{ww^*}{\|w\|^2}$$

(which is completely determined by the vector w). Then, for instance, a rank-3 codeword can be constructed from three vectors $v_i^1 \in V^1$, $v_j^2 \in V^2$, $v_k^3 \in V^3$ as.

$$A(v_i^1, v_j^2, v_k^3) = \quad (19)$$

$$\left[ v_i^1, HH(v_i^1 - e_1^M)\begin{bmatrix} 0 \\ v_j^2 \end{bmatrix}, HH(v_i^1 - e_1^M)\begin{bmatrix} 0 \\ HH(v_j^2 - e_1^{M-1})\begin{bmatrix} 0 \\ v_k^3 \end{bmatrix} \end{bmatrix} \right].$$

An advantageous aspect of the exemplary scheme is that only the set of vectors $V^1, \ldots, V^{M-1}$ along with some complex scalars are stored at the UE which results in a considerably lower memory requirement compared to unstructured matrix codebooks.

The matrix representation of the codebook can be stored at the base station, where memory requirements are not as stringent. For a given channel realization, the UE does not have to construct the precoding matrix to determine the optimal precoder index and the corresponding MMSE filter.

For example, if the base station has M=4 transmit antennas, for a codebook of size 16 (per-rank), the following vector codebooks can be constructed:

$$V^1 = \{v_i^1 \in C^4\}_{i=1}^4, V^2 = \{v_j^2 \in C^3\}_{j=1}^4, V^3 = [1,0]^T \in C^2. \quad (20)$$

For convenience, the case of a 2-antenna UE is considered. The generalization to the 4-antenna case is straightforward. The codebook of rank-2 contains 16 precoding matrices obtained as:

$$A(v_i^1, v_j^2,) = \left[ v_i^1, HH(v_i^1 - e_1^4)\begin{bmatrix} 0 \\ v_j^2 \end{bmatrix} \right], 1 \le i, j \le 4, \quad (21)$$

and the codebook of rank-1 also has 16 possibilities that are obtained as the second columns of all possible $\{A(v_i^1, v_j^2)\}$, respectively.

Rank Adaptation Scheme for MIMO Downlink

Figure 2:
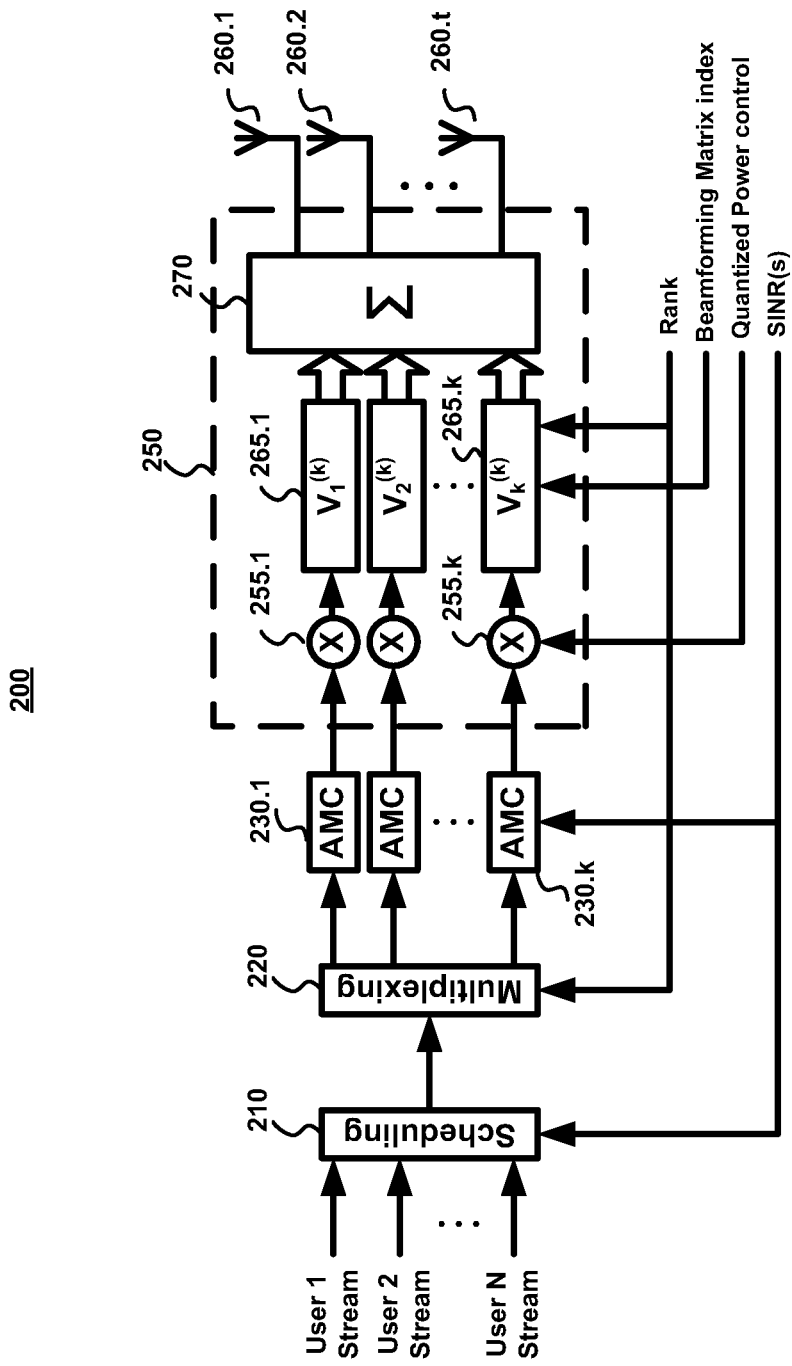
FIG. 2 is a block diagram of an exemplary embodiment of a base station of an orthogonal frequency-division multiplexing (OFDM) wireless MIMO communication system with feedback from the user equipment (UE).

FIG. 2 is a block diagram of the downlink portion of an exemplary embodiment of a base station (BS) 200 of an orthogonal frequency-division multiplexing (OFDM) wireless MIMO communication system with feedback from the user equipment (UE). The base station 200 comprises a downlink scheduler 210, a multiplexer 220, multiple Adaptive Modulation and Coding scheme blocks (AMC) 230.1-230.k, and a beamforming block 250 driving multiple transmit antennas 260.1-260.t. The beamforming block 250 comprises power controllers 255.1-255.k, which scale the power of the signals for each stream to be transmitted along k different eigenvectors 265.1-265.k which are then combined in 270 and transmitted by the transmit antennas 260.1-260.t.

The various blocks of the base station 200 operate in accordance with information fed-back from UE (not shown), including, for example, rank, beamforming matrix index, quantization power control, and Signal to Interference and Noise Ratio (SINR). The SINR information fed-back from the UEs is used by the downlink scheduler 210 to select a user stream from a plurality of user streams for transmission over the downlink to the intended UE. Based on the rank feedback, the multiplexer block 220 generates the appropriate number of signal streams and the AMC blocks 230 choose the corresponding modulation and coding for each stream.

In an exemplary embodiment of the present invention, in order to achieve the best performance over an OFDM-based downlink with reasonable feedback, the available sub-carriers are divided into chunks of adjacent tones and provide a feedback signal including the rank information, the beamforming matrix index, and channel quality indices (CQIs) on a per-chunk basis. The CQIs can be the SINR for each stream. A chunk size of one is throughput optimal. Simulation results show, however, that a larger chunk size (if chosen properly) can significantly reduce the feedback overhead with almost negligible loss in throughput. This fact follows the property that the precoder, i.e., beamforming matrix, chosen for a tone usually is also the best precoder for the adjacent tones (up to a certain neighborhood size) out of the available quantized precoders in the codebook. It is possible to optimally design and also select wideband precoders for the set of parallel channels, i.e., all tones in the chunk. An exemplary strategy of selecting the optimal precoder for the center tone in each chunk and then using it for the entire chunk is described below. Moreover, to further reduce the feedback from the UEs, each UE can choose to send information about only the first few of its "best" chunks rather than all of them.

Figure 3:
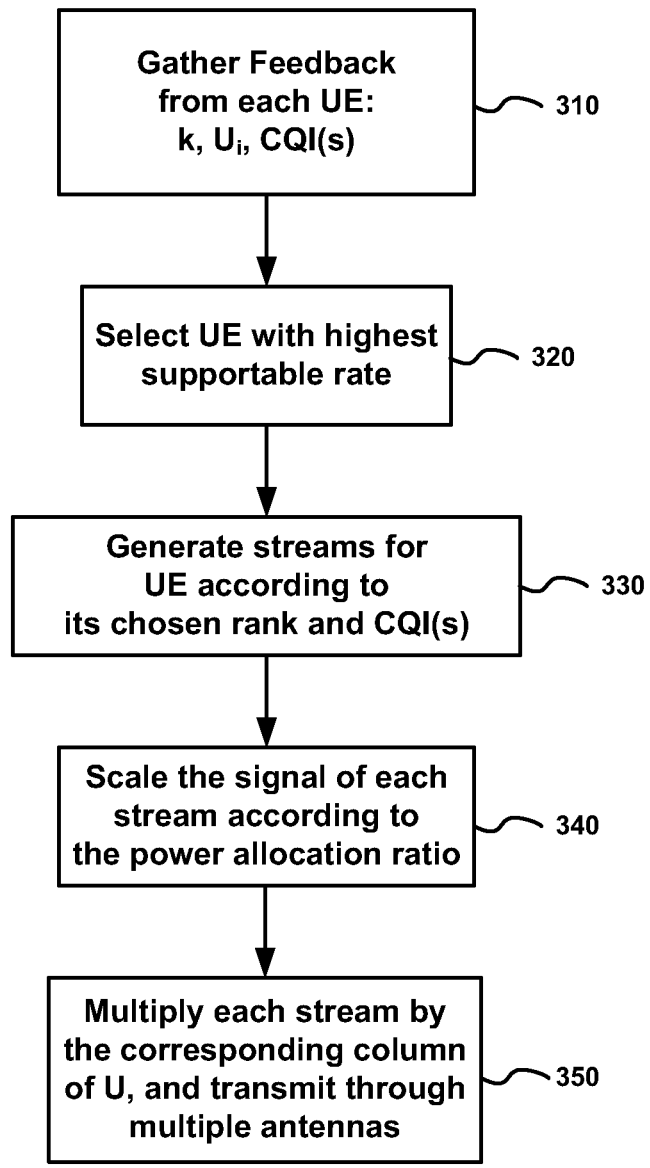
FIG. 3 is a flowchart of the operation of a base station, such as that of FIG. 2, in accordance with an exemplary embodiment of the present invention.
Figure 4:
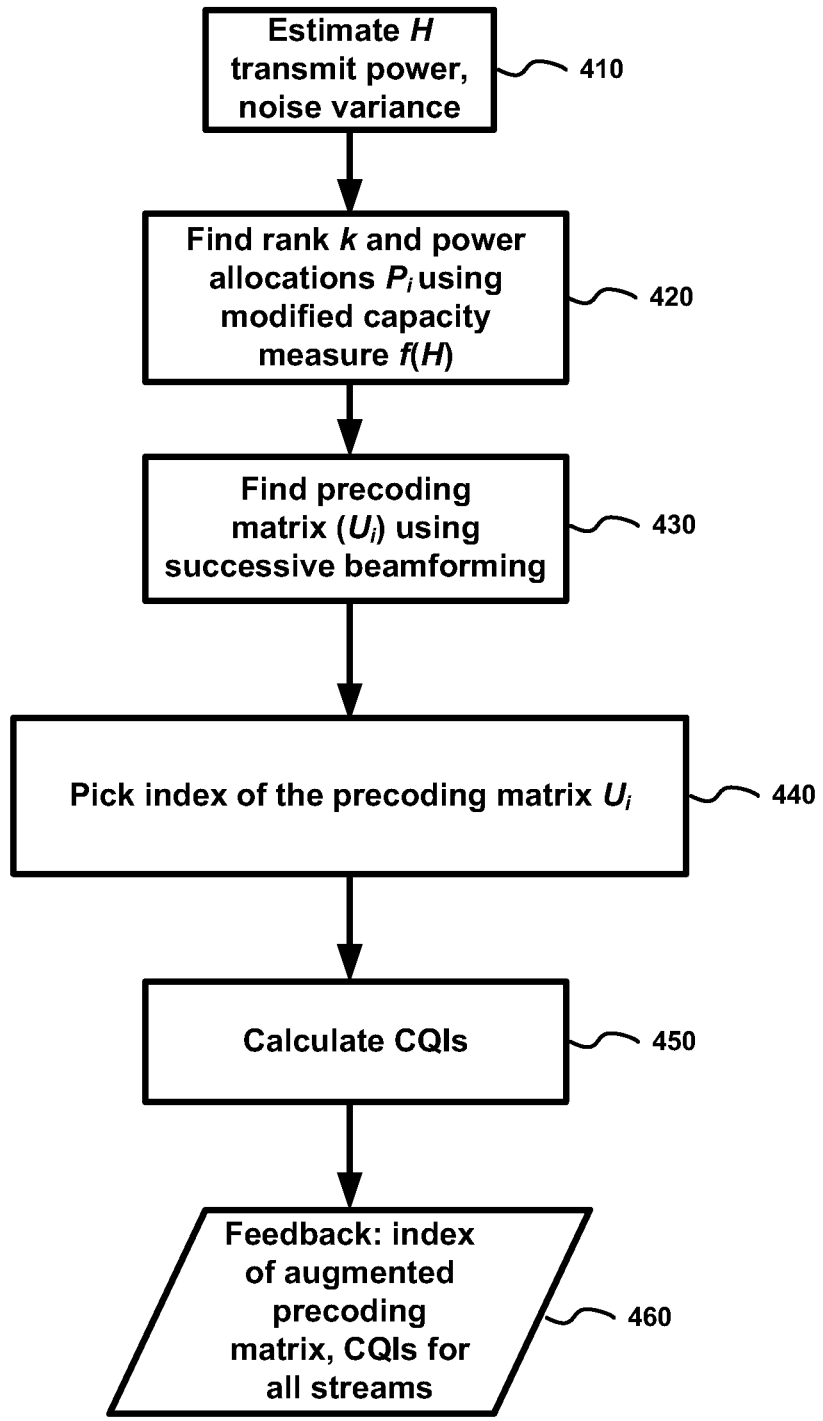
FIG. 4 is a flowchart of the operation of a UE in accordance with an exemplary embodiment of the present invention.

FIG. 3 is a flowchart which generally illustrates the operation of a base station (BS) in accordance with an exemplary embodiment of the present invention. FIG. 4 is a flowchart illustrating the operation of a UE in accordance with the exemplary embodiment. A high-level description of FIGS. 3 and 4 is provided and details such as particular chunk-size used, OFDM implementation, etc. have been omitted for convenience.

As shown in FIG. 3, at step 310, the base station obtains the various items of feedback information from each UE, including the rank information (k), the beamforming matrix index (i), and CQI(s). At 320, the base station selects the UE with the highest supportable rate and at 330, generates signal streams for the selected UE according to its rank and CQI(s). The signal of each stream is scaled at 340 in accordance with a power allocation ratio and at 350, each stream is multiplied by the corresponding column of the precoding matrix U and transmitted via the multiple transmit antennas to the receiving UE.

At the UE, as shown in FIG. 4, the channel matrix H, the transmit power, and noise variance are estimated at 410. The ratio of transmit power to noise variance defines the transmit SNR used in the selection of the rank and the beamforming matrix. At step 420, the UE determines the rank k and power allocation $P_i$ using a modified capacity measure. In an alternative embodiment described below, these parameters are determined by the base station. An algorithm for carrying out step 420 is described below in greater detail with reference to FIG. 5.

At 430, the UE determines the precoding matrix $U_i$ using successive beamforming. An exemplary successive beamforming algorithm which allows for a considerable reduction in computational complexity as well as the memory requirement of the UE without sacrificing much throughput performance is described below with reference to FIG. 6.

At 440, the UE finds the index of the augmented precoding matrix as determined by the precoding matrix $U_i$ and the power allocation $P_i$.

At 450, the one or more CQIs are then calculated for the corresponding receiver (e.g., LMMSE or MMSE-SIC) using multiple or single codeword transmission. A CQI calculation algorithm is described below with reference to FIG. 7.

Figure 5:
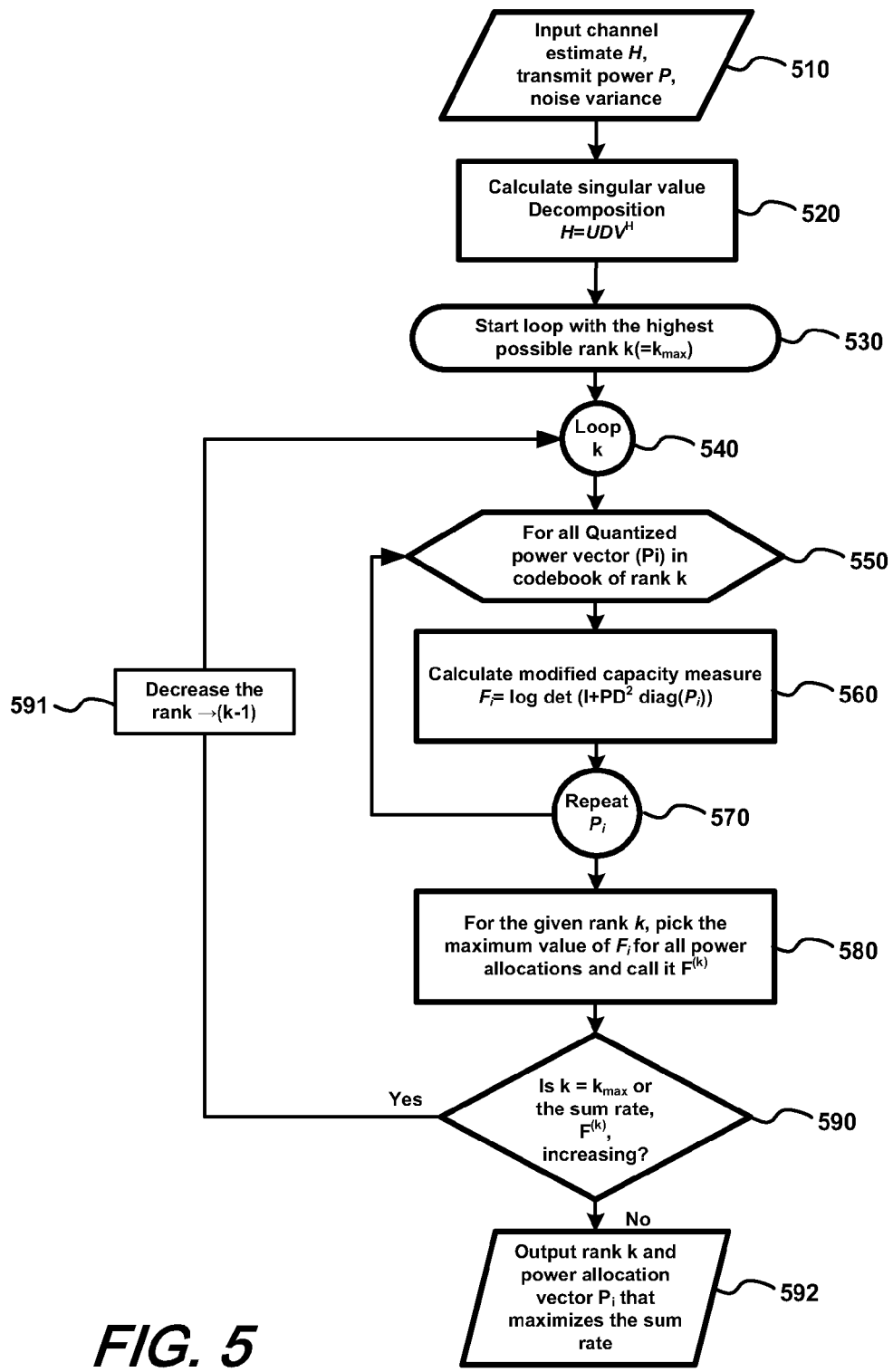
FIG. 5 is a flowchart of an algorithm for determining rank and power allocations for a downlink using a modified capacity measure in accordance with an exemplary embodiment of the present invention.

FIG. 5 is a flowchart of an algorithm for determining the rank k and power allocations $P_i$ using a modified capacity measure f(H), defined below. At 510, the estimated channel matrix H, transmit power P, and noise variance are provided as inputs. At 520, the singular value decomposition is performed, as described above. At 530 and 540, a processing loop is initiated starting with the highest possible rank. At 550-570, for all quantized power vectors in the codebook of a given rank, the modified capacity measure $F_i$ is calculated in accordance with the following expression:

$$f(H)=f(UDV^*)=F_i=\log \det(I+PD^2\mathrm{diag}(P_i)). \qquad (22)$$

where H is the estimated channel matrix and H=UDV* is the singular value decomposition of H.

At 580, the maximum value of the modified capacity measure $F_i$ for the given rank is selected and designated $F^{(k)}$, referred to as the sum rate. At 590, a determination is made as whether the highest rank has been processed or whether $F^{(k)}$ is increasing. If either condition is true, operation branches to 591, in which the rank is decremented and the loop starting at 540 is repeated. If not, operation proceeds to 592 in which the rank and power allocation that maximize the sum rate $F^{(k)}$ are provided as outputs.

In an alternative embodiment, successive beamforming can be performed for each rank separately, the CQI information can be calculated, and then a decision made as to which rank is optimal. Instead of trying out all of the possible ranks, the exemplary algorithm of FIG. 5, however, starts off with the maximum rank and decreases the rank until the point when the rate supported by the channel does not increase.

Figure 6:
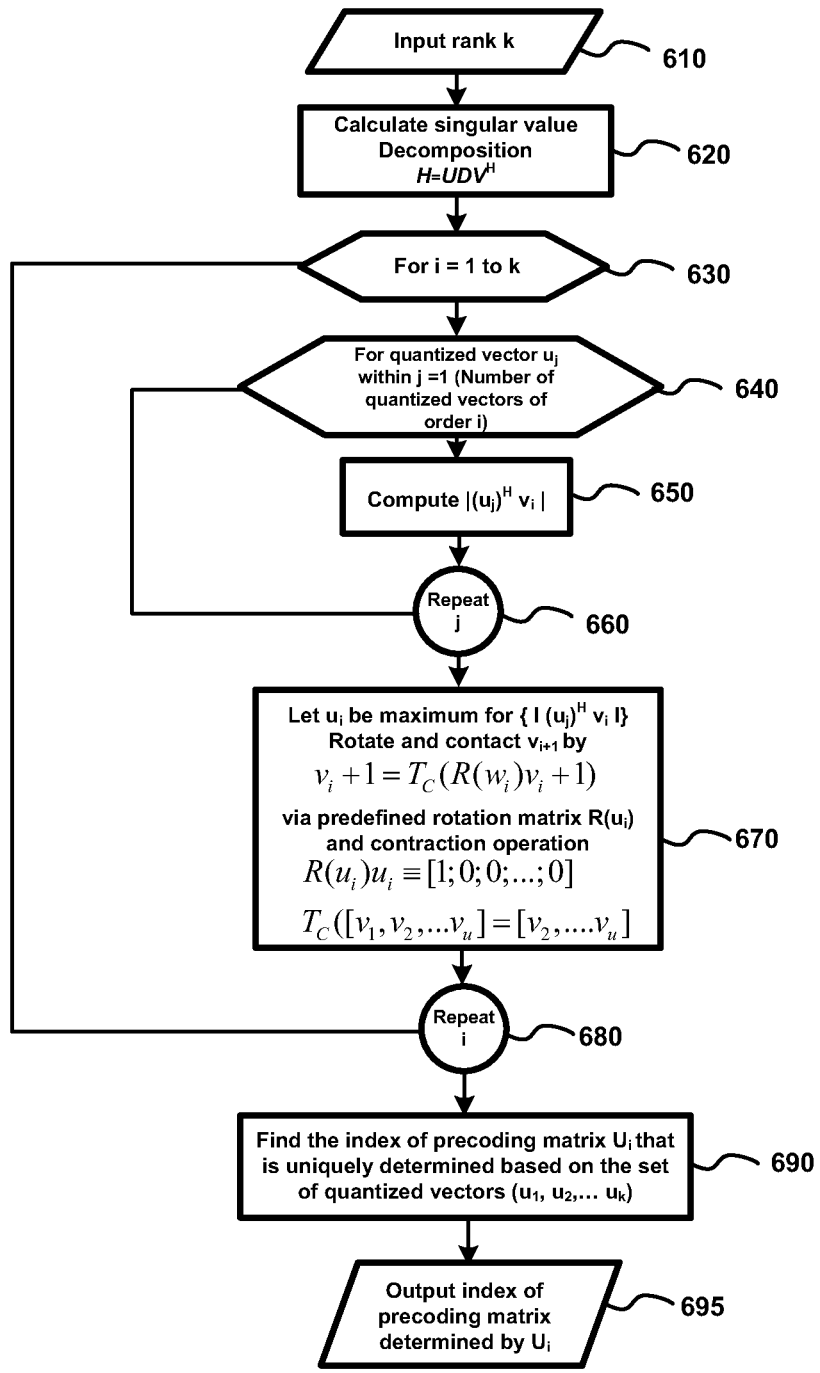
FIG. 6 is a flowchart of a successive beamforming algorithm in accordance with an exemplary embodiment of the present invention.

FIG. 6 is a flowchart of an exemplary successive beamforming algorithm. At 610, the rank k is provided as an input and at 620, the singular value decomposition is performed, as described above. At 630-680, an inner product calculation between the eigenvectors of the channel the corresponding vectors from the codebook is performed within nested loops. At 690, the index of the precoding matrix uniquely determined by the set of quantized vectors is found and is output at 695.

Figure 7:
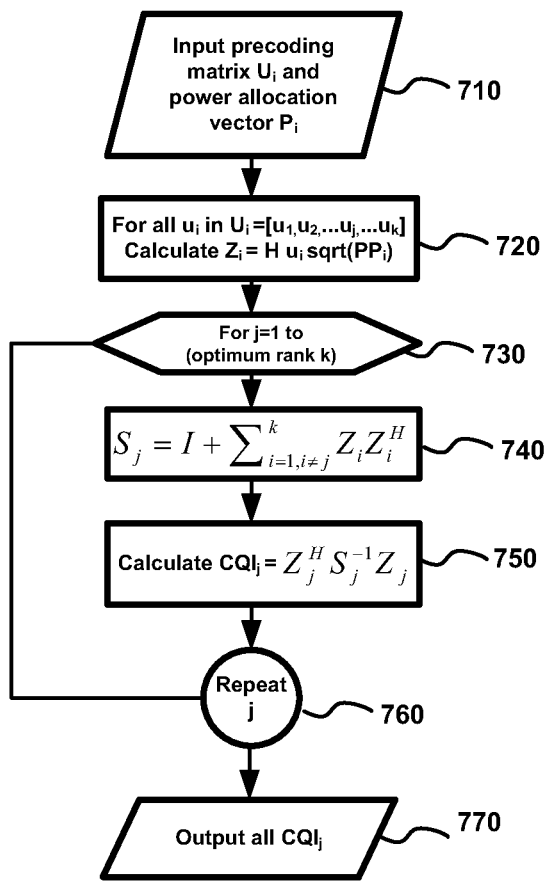
FIG. 7 is a flowchart of a CQI calculation algorithm in accordance with an exemplary embodiment of the present invention.

FIG. 7 is a flowchart of an exemplary CQI calculation algorithm for MCW transmission for reception by an LMMSE decoder. After inputting the precoding matrix and power allocation vector at 710, an intermediate variable Z is calculated at 720. A processing loop is then commenced at 730 in which a further intermediate variable S is calculated at 740. A CQI for each of the k streams of rank k is then calculated at 750 based on the intermediate variables S and Z. Operation loops back at 760 until the CQIs for all streams have been determined. The CQIs are then output at 770.

As an alternative to determining a CQI for each stream, the CQIs of all streams of a rank can be combined, so as to output only one CQI value.

Simulation Results

An exemplary embodiment of the present invention has been simulated with the parameters indicated in FIG. 8A. A modulation and coding scheme (MCS) table with 32 entries was chosen and was used for CQI quantization for all the simulated schemes. Since only two antennas are assumed at the UE, the transmission rank is at most two. As shown in FIG. 8B, eight bits are used for two-rank precoding feedback. The first bit indicates the beamforming rank followed by 7 bits that represents the index of a precoder for the given rank. For both rank 1 and rank 2 beamforming, the "xxxx" bits represent the feedback bits for the first vector and the "yyy" bits represent the feedback bits for the second vector.

For rank 2, there would be a total of $2^7$ precoding (or beamforming) matrices, comprising the Cartesian product of $2^4$ vectors in $C^4$ space and $2^3$ vectors in $C^3$ space. Therefore, the total memory required to store the codebook would be 16*4+8*3=88 complex numbers. For rank 1, successive beamforming is applied in order to reduce the memory requirement from $2^7*4=512$ complex numbers to only 24 complex numbers.

In accordance with the Spatial Channel Model (SCM) defined in 3GPP, a UE will be dropped with a given distribution when it is between 45 and 500 meters from the BS. As such, the initial pathloss and shadowing values affect the entire simulation results per run. In order to average out the effect of these parameters, the average performance of each scheme over multiple drops was simulated.

Figure 9:
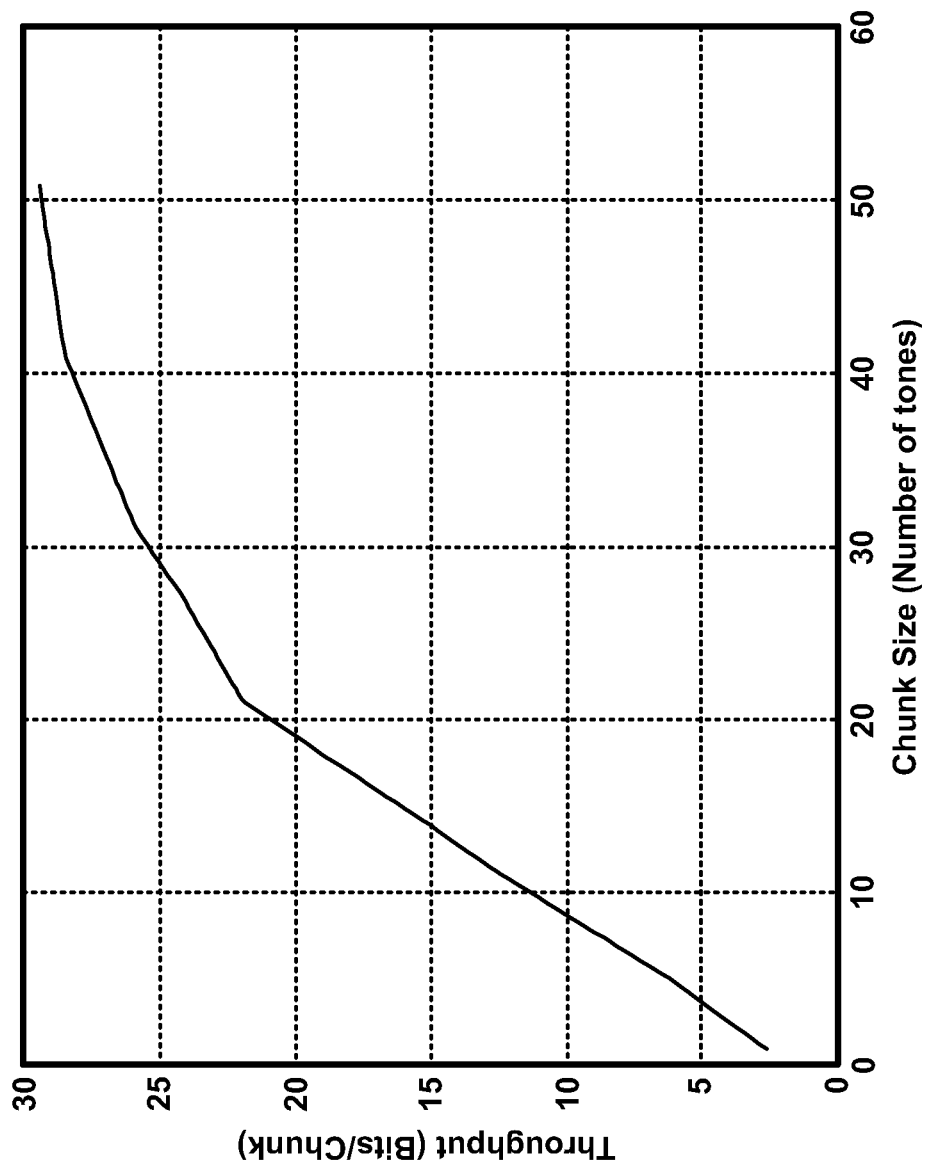
FIG. 9 is a graph of bits per chunk vs. chunk size for the simulated exemplary embodiment of the present invention.

As mentioned, the feedback signals are sent per chunk in order to reduce the feedback requirement. For the given simulation setup of FIG. 8A, using 21 adjacent tones was determined to be the best chunk size. FIG. 9 illustrates the effect of chunk size on the throughput of the exemplary scheme at $P/N_0$=20 dB when the chunk size varies from 1 to 51. $P/N_0$ is the ratio of the transmit power to the noise variance. It is observed that the throughput increases almost linearly at the beginning, with a relatively steep slope and then flattens out with a shallower slope at larger chunk sizes. In order to reduce the feedback requirement, it is desirable to increase the chunk size as much as possible, while the throughput will be adversely affected with larger chunk sizes. FIG. 9 shows that choosing approximately 21 tones per chunk provides the highest ratio of relative throughput per chunk size for the simulated exemplary embodiment.

Figure 10:
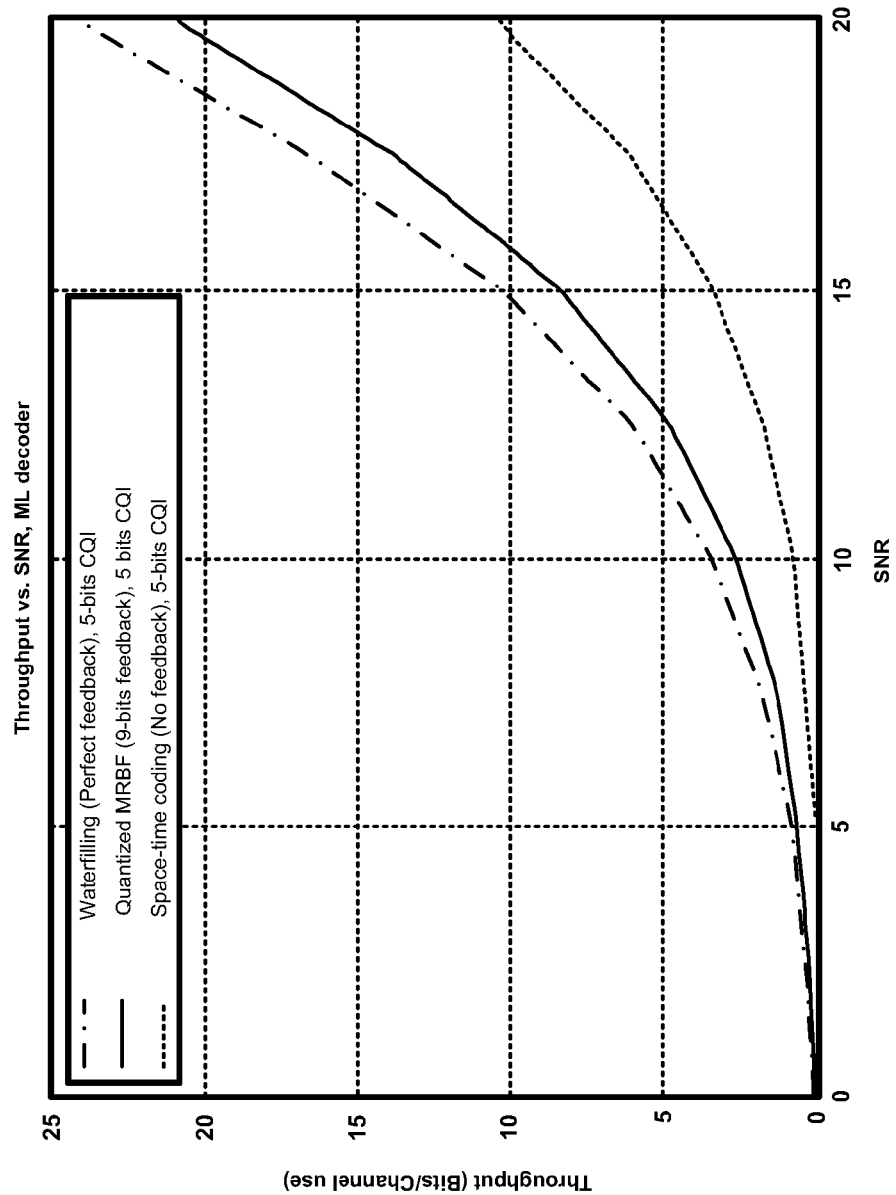
FIG. 10 is a graph of throughput vs. SNR for the simulated exemplary scheme against fundamental limits using a finite set of rates (5 CQI bits).

FIG. 10 illustrates the relative performance of the simulated exemplary scheme against fundamental limits using a finite set of rates (only 5 CQI bits). FIG. 10 shows that the relative gain due to the addition of channel state information at the transmitter (i.e., CSIRT versus CSIR) for the simulated scenario (4 transmit and 2 receive antennas) is considerable. Therefore, the importance of an effective feedback strategy becomes more dominant. FIG. 10 also shows that the simulated exemplary feedback strategy (in a typical scenario) is capable of bridging almost 80% of the gap between the performances of a system with CSIRT versus CSIR only.

Figure 11:
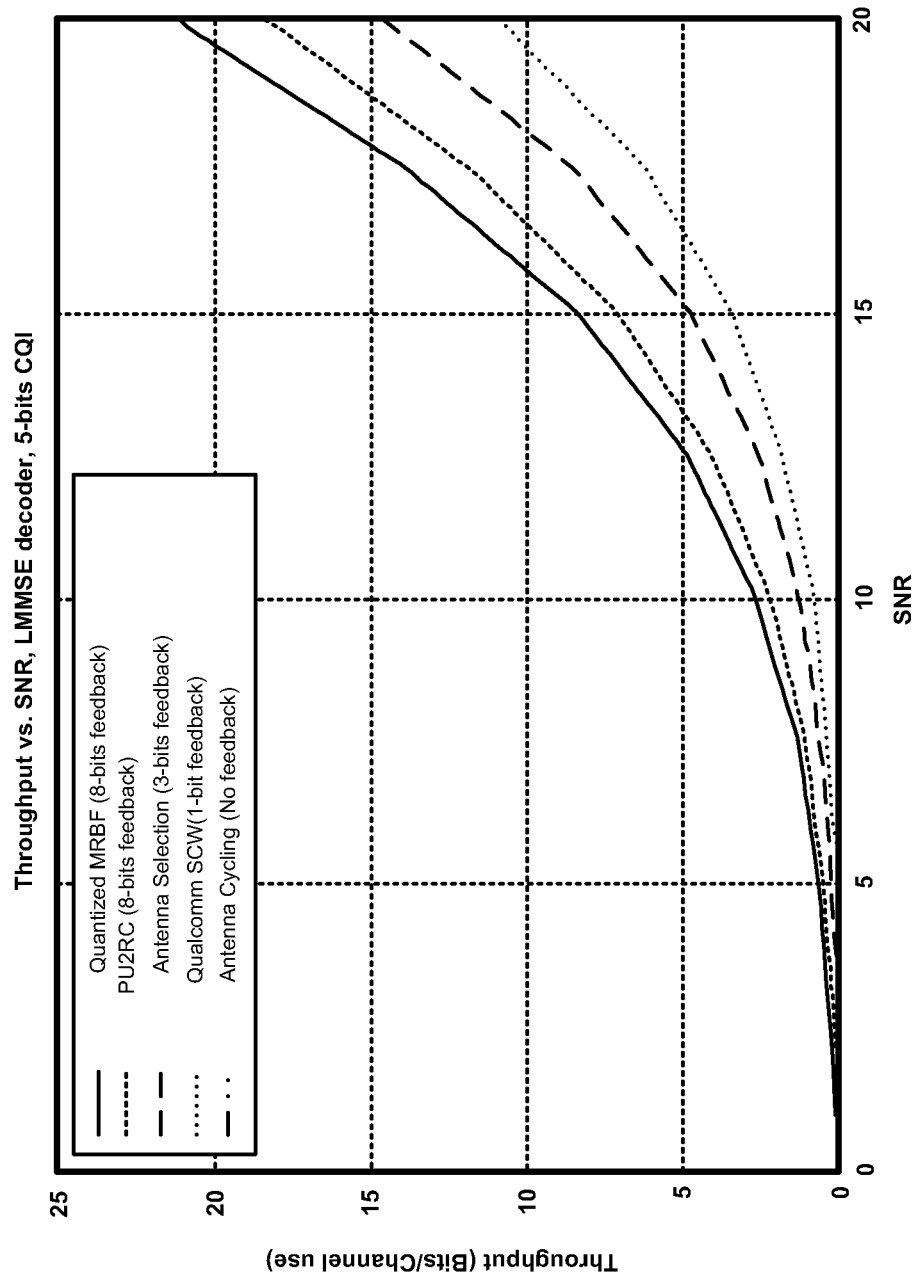
FIG. 11 is a graph of throughput vs. SNR for the simulated exemplary scheme as compared to selected known schemes.

FIG. 11 provides a cross comparison of an exemplary scheme in accordance with the present invention against selected other schemes including: (i) PU2RC by Samsung with 8-bit feedback, (ii) antenna selection with 3-bits feedback, (iii) rank adaptation and cycling by Qualcomm, with SCW and 1-bit feedback, and (iv) a 2-streams antenna cycling scheme with no feedback. It should be noted that a thorough comparison between different schemes can be performed with system level simulation, whereas FIG. 11 provides a link level comparison.

Figure 12:
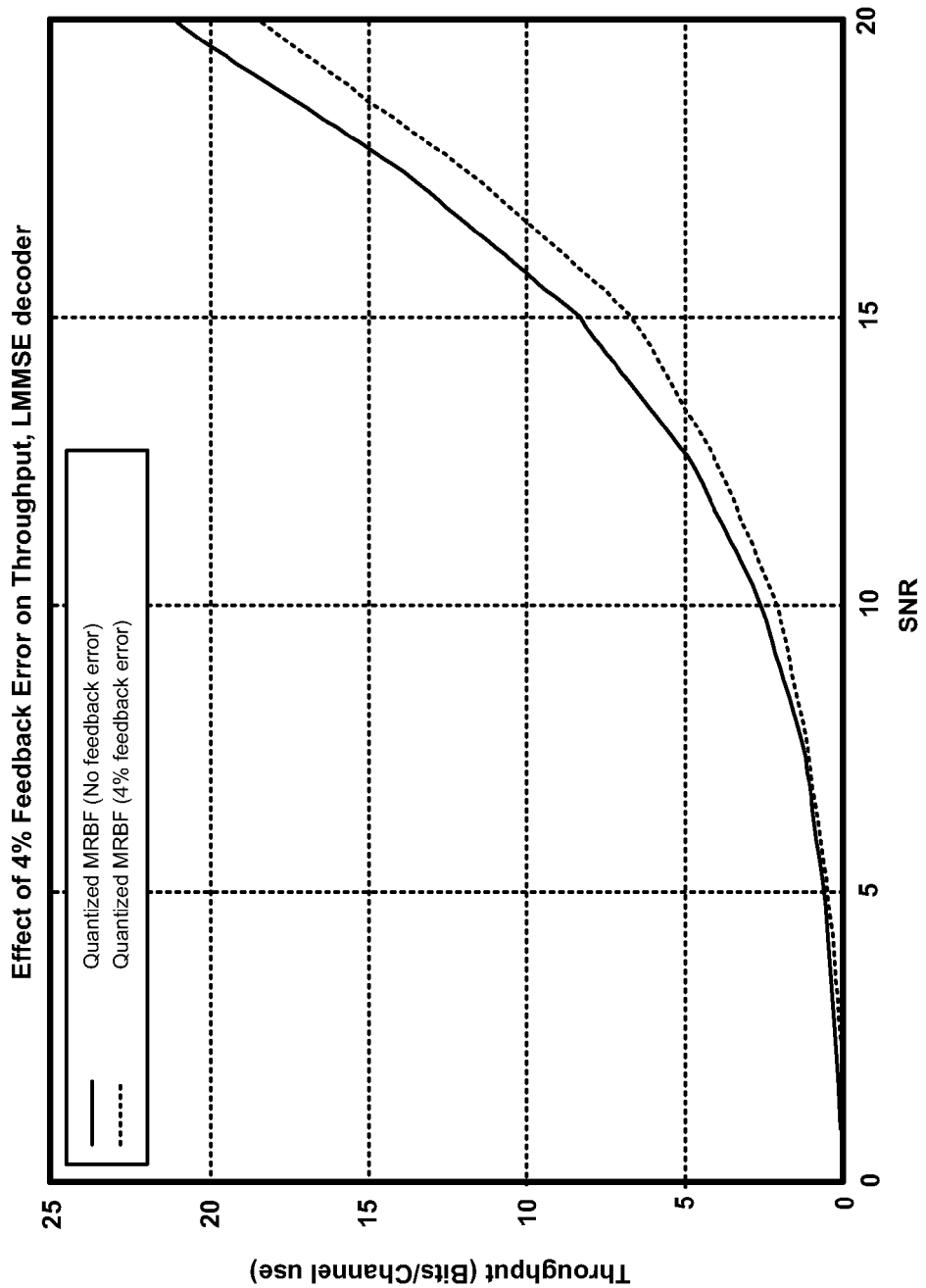
FIG. 12 is a graph of throughput vs. SNR showing the effect of feedback error for the simulated exemplary embodiment of the present invention.

FIG. 12 shows the effect of a typical feedback error on the performance of the exemplary scheme. It seems that the effect of feedback error on the rank information bit is more destructive than its effect on the other feedback bits. Therefore, more protection for this bit is indicated.

UE Operation for Alternative Embodiment

Figure 13A:
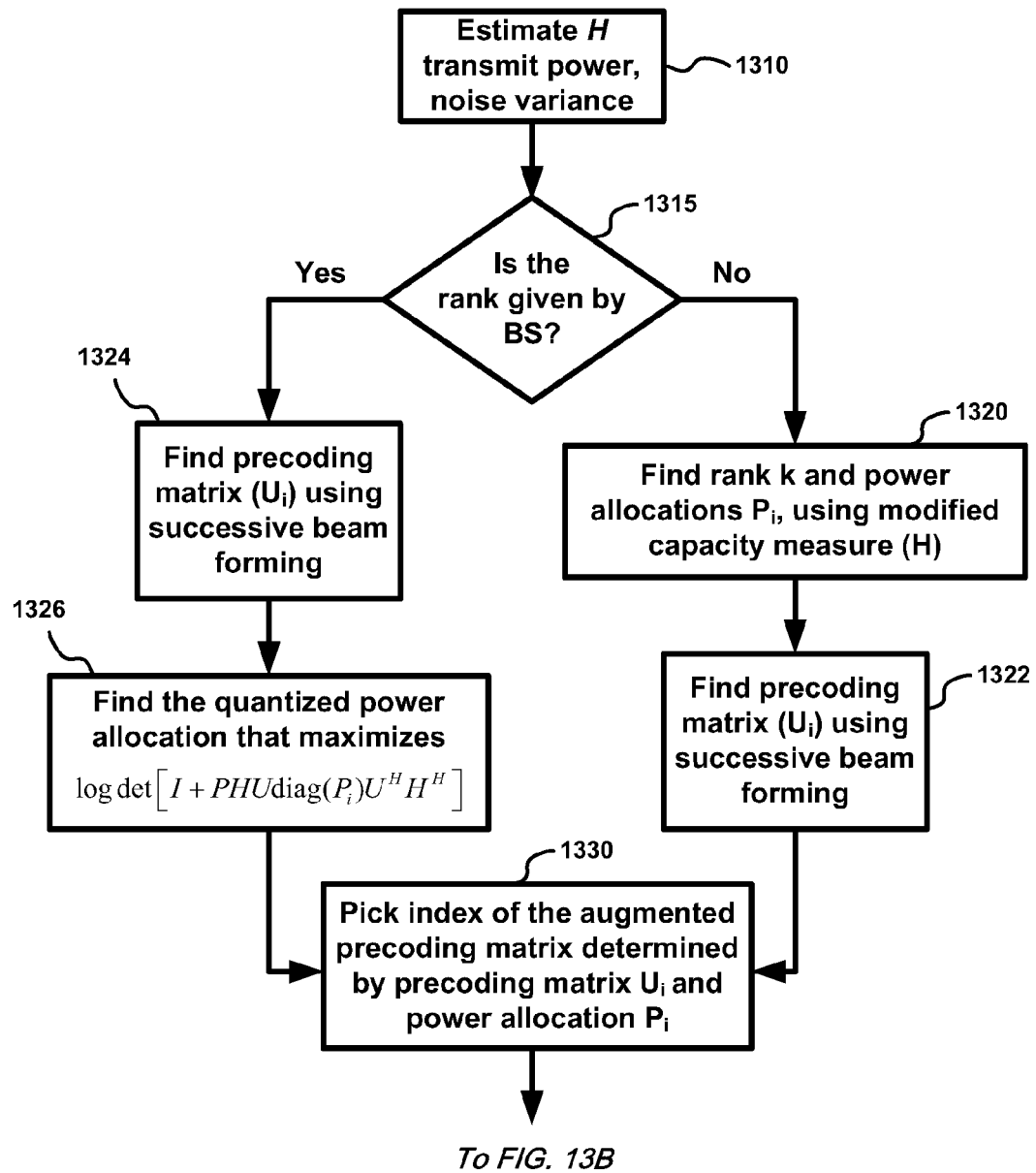
FIGS. 13A and 13B show a flowchart which illustrates the UE operation for an alternative exemplary embodiment of a rank adaptation scheme for a MIMO downlink in which the beamforming rank may be provided by the base station and which can accommodate various receivers.
Figure 13B:
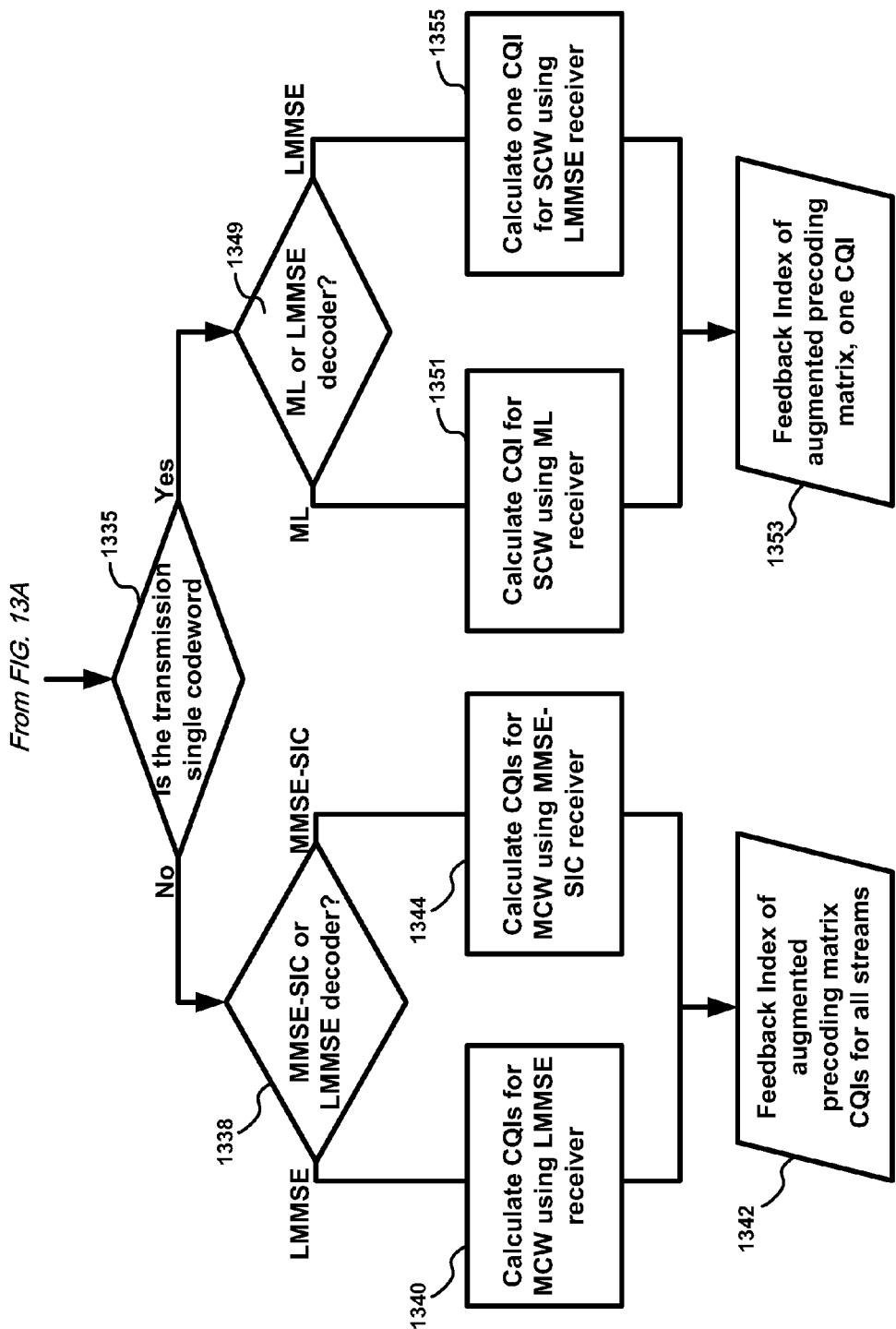
Figure 14:
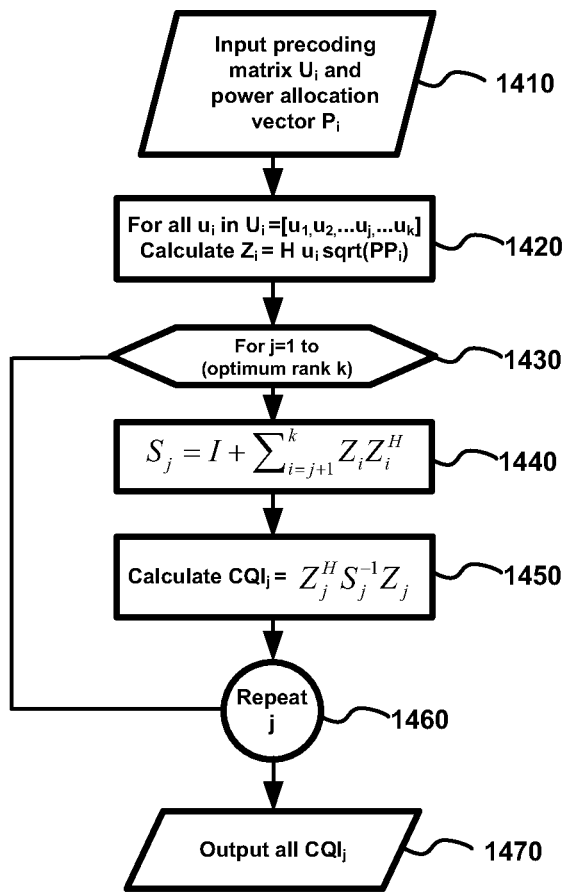
FIG. 14 shows a flowchart of an algorithm for calculating CQIs for MCW transmission for reception by a MMSE-SIC decoder.
Figure 15:
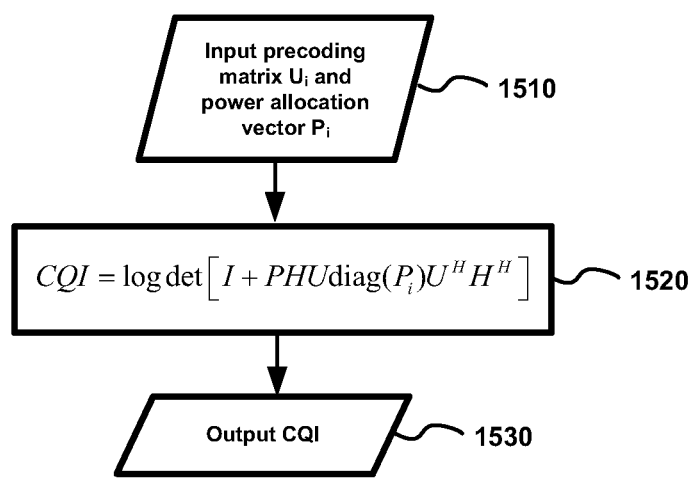
FIG. 15 shows a flowchart of an algorithm for calculating a CQI for SCW transmission for reception by a ML decoder.
Figure 16:
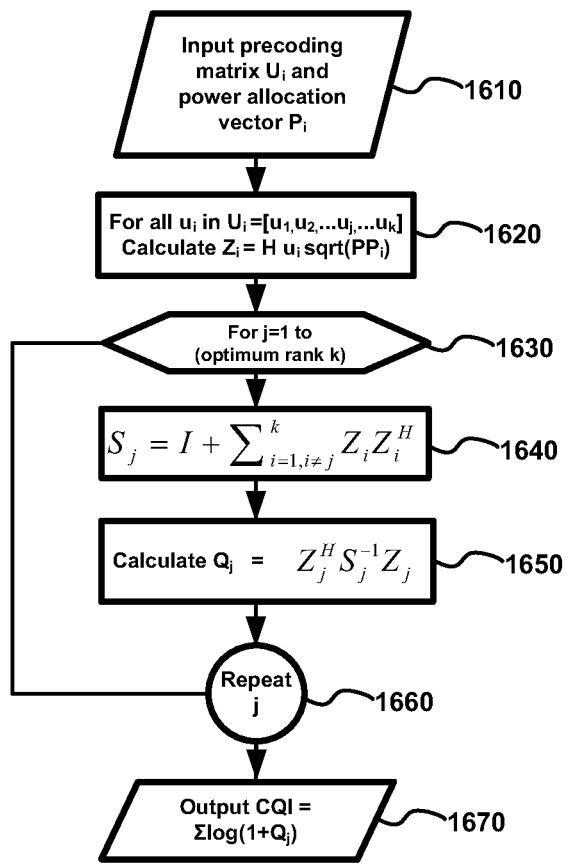
FIG. 16 shows a flowchart of an algorithm for calculating a CQI for SCW transmission for reception by a LMMSE decoder.

FIGS. 13A and 13B show a flowchart which illustrates the UE operation for an alternative exemplary embodiment of a rank adaptation scheme for a MIMO downlink in which the beamforming rank may be provided by the base station (BS) and which can accommodate various receivers, including LMMSE, MMSE-SIC, and ML receivers.

As shown in FIG. 13A, the UE estimates the channel matrix H, the transmit power, and noise variance at 1310. At 1315, a determination is made as to whether or not the rank is provided by the BS. If not, operation proceeds to step 1320, in which the UE determines the rank k and power allocation $P_i$ using a modified capacity measure f(H). An algorithm for carrying out step 1320 is described above in greater detail with reference to FIG. 5.

Operation proceeds to step 1322 in which the UE determines the precoding matrix $U_i$ using successive beamforming. A successive beamforming algorithm is described above with reference to FIG. 6.

At 1330, the UE picks the index of the augmented precoding matrix, the augmented precoding matrix comprising by the precoding matrix $U_i$ and the power allocation $P_i$.

If it was determined at 1315 that the rank is provided by the BS, operation proceeds to step 1324 in which the UE determines the precoding matrix $U_i$ using successive beamforming. The successive beamforming algorithm described above with reference to FIG. 6 can be used for this purpose. Operation then proceeds to step 1326 in which the quantized power allocation that maximizes the following expression is determined:

$$\log \det [I + PHU \mathrm{diag}(P_i) U^H H^H] \quad (23)$$

This expression defines the achievable rate of a precoded MIMO system with precoding matrix U and power allocation given by diag($P_i$), assuming a Gaussian codebook.

The indexing is done by scanning row-by-row or column-by-column the black-and-white image representing UV spots and assigning a number to each spot in order.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A base station used in a wireless communications system with multiple transmission ranks, the base station comprising:
    a memory to store a codebook for a transmission rank;
    a beamforming controller to precode data with a precoding matrix selected from the codebook, wherein the selection of the precoding matrix is based on a first description and a second description, the first description and the second description being unique to the precoding matrix; and
    a transmitter to transmit the precoded data to a user equipment,
    wherein the second description provides a finer description of the code book than the first description.

2. The base station as in claim 1, wherein the code book comprises a vector code book.

3. The base station as in claim 1, wherein the selection of the precodinq matrix comprises calculation.

4. A user equipment used in a wireless communications system with multiple transmission ranks, the user equipment comprising:
    a memory to store a codebook for a transmission rank; and
    a receiver to receive, from a base station, data precoded with a precoding matrix,
    wherein the precoding matrix is selected from a codebook for a transmission rank, wherein the selection of the precoding matrix is based on a first description and a second description, the first description and the second description being unique to the precoding matrix, and
    wherein the second description provides a finer description of the code book than the first description.

5. The user equipment as in claim 4, wherein the codebook comprises a vector codebook.

6. The user equipment as in claim 4, wherein the selection of the precoding matrix comprises calculation.

7. A user equipment used in a wireless communications system with multiple transmission ranks, the user equipment comprising:
    a memory to store a codebook for a transmission rank; and
    a transmitter to transmit to a base station an indication for a precoding matrix in order for the base station to precode data,
    wherein the precoding matrix is selected from a codebook for a transmission rank, wherein the selection of the precoding matrix is based on a first description and a second description, the first description and the second description being unique to the precoding matrix, and
    wherein the second description provides a finer description of the code book than the first description.

8. The user equipment as in claim 7, wherein the codebook comprises a vector codebook.

9. The user equipment as in claim 7, wherein the selection of the precoding matrix comprises calculation.

* * * * *

UNITED STATES PATENT AND TRADEMARK OFFICE
CERTIFICATE OF CORRECTION

| | | |
|---|---|---|
| PATENT NO. | : 9,444,536 B2 | Page 1 of 1 |
| APPLICATION NO. | : 14/819734 | |
| DATED | : September 13, 2016 | |
| INVENTOR(S) | : Mohammad Khojastepour | |

It is certified that error appears in the above-identified patent and that said Letters Patent is hereby corrected as shown below:

In the Claims

Claim 3, Col. 14, Line 29, "precodinq" should read as --precoding--.

Signed and Sealed this
Twenty-second Day of November, 2016

Michelle K. Lee
*Director of the United States Patent and Trademark Office*